(12) United States Patent
Musaed

(10) Patent No.: US 12,324,534 B2
(45) Date of Patent: Jun. 10, 2025

(54) FLEXIBLE INTELLIGENT PARCEL LOCKER

(71) Applicant: Imam Abdulrahman Bin Faisal University, Dammam (SA)

(72) Inventor: Aiman Abdulbaset Ali Musaed, Khobar (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 188 days.

(21) Appl. No.: 18/167,592

(22) Filed: Feb. 10, 2023

(65) Prior Publication Data

US 2024/0268590 A1 Aug. 15, 2024

(51) Int. Cl.
*A47G 29/14* (2006.01)
*G06Q 10/0836* (2023.01)
*G06K 7/14* (2006.01)
*G06Q 10/0833* (2023.01)

(52) U.S. Cl.
CPC ....... *A47G 29/141* (2013.01); *G06Q 10/0836* (2013.01); *A47G 2029/145* (2013.01); *A47G 2029/149* (2013.01); *G06K 7/1413* (2013.01); *G06Q 10/0833* (2013.01)

(58) Field of Classification Search
CPC ...... A47G 29/20; A47G 29/22; A47G 29/141; A47G 2029/145; A47G 2029/149; G06K 7/1413; G06Q 10/0833; G06Q 10/0836; B65D 21/086
See application file for complete search history.

(56) References Cited

U.S. PATENT DOCUMENTS

| | | | |
|---|---|---|---|
| 9,504,344 B2 * | 11/2016 | Sarvestani | A47G 29/1201 |
| 10,053,288 B1 * | 8/2018 | Rawal | G06Q 10/0836 |
| 10,624,484 B1 * | 4/2020 | Mountford | B60P 3/03 |
| 10,888,189 B2 | 1/2021 | Pointeau | |
| 11,131,138 B2 * | 9/2021 | Wei | A47G 29/20 |
| 11,346,150 B1 * | 5/2022 | Johnston | A47G 29/141 |
| 12,016,478 B2 * | 6/2024 | Newcomb | A47G 29/141 |
| 12,134,933 B1 * | 11/2024 | Johnston | A47G 29/28 |
| 2013/0264381 A1 * | 10/2013 | Kim | G07F 17/13 232/24 |
| 2015/0106292 A1 | 4/2015 | Robinson et al. | |

(Continued)

FOREIGN PATENT DOCUMENTS

JP 2872965 3/1993

*Primary Examiner* — William L Miller

(74) *Attorney, Agent, or Firm* — Oblon, McClelland, Maier & Neustadt, L.L.P.

(57) ABSTRACT

An intelligent parcel locker and methods for forming a package container in the parcel locker are provided. The parcel locker includes multiple front plates connected by multiple actuatable linking pins, a first single vane rotary actuator to dispense linked first side plates, a second single vane rotary actuator to dispense linked second side plates, a third single vane rotary actuator to dispense linked top plates, and a fourth single vane rotary actuator to dispense linked bottom plates. The parcel locker further includes a computing device connected to the multiple rotary actuators and the actuatable linking pins, receives a request to form the package container of a size to hold a package, generates command signals to actuate the rotary actuators to form the package container, and actuates the actuatable linking pins to form a front door of the package container.

15 Claims, 24 Drawing Sheets

(56) References Cited

U.S. PATENT DOCUMENTS

| | | |
|---|---|---|
| 2016/0066732 A1 | 3/2016 | Sarvestani |
| 2019/0231105 A1* | 8/2019 | Pointeau ............ G07C 9/00896 |
| 2020/0128992 A1 | 4/2020 | Mountford et al. |
| 2021/0005033 A1 | 1/2021 | Roman et al. |
| 2021/0038004 A1* | 2/2021 | Graña Domínguez ...................... A47G 29/141 |
| 2021/0127880 A1 | 5/2021 | Raphael et al. |
| 2021/0321810 A1* | 10/2021 | Sun ..................... G07F 11/1653 |
| 2023/0012772 A1* | 1/2023 | Kalathil ................. A47G 29/30 |
| 2024/0349888 A1* | 10/2024 | Liu ...................... A47B 88/417 |
| 2024/0349924 A1* | 10/2024 | Issack .................. A47G 29/141 |

\* cited by examiner

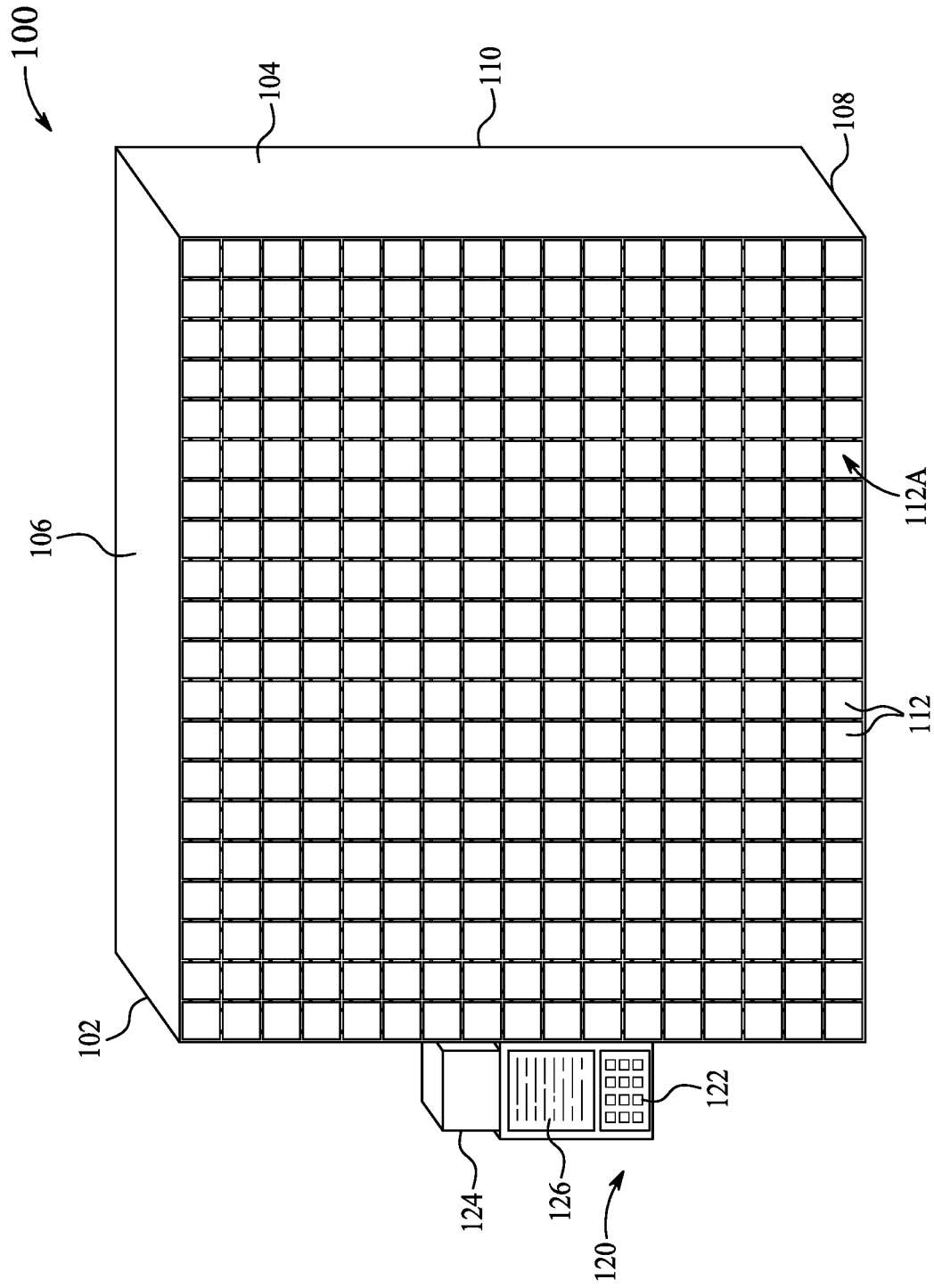

FIG. 10

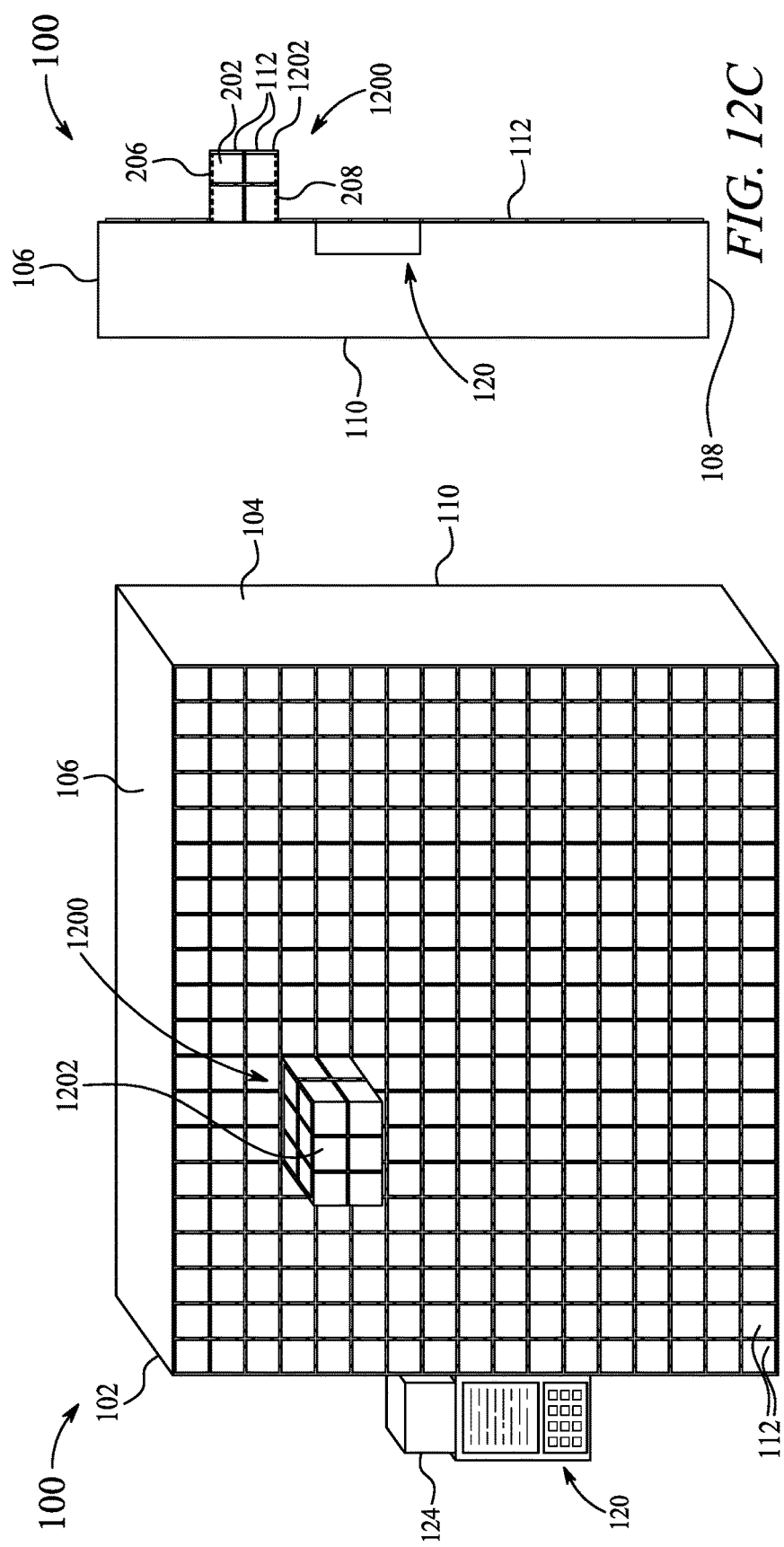
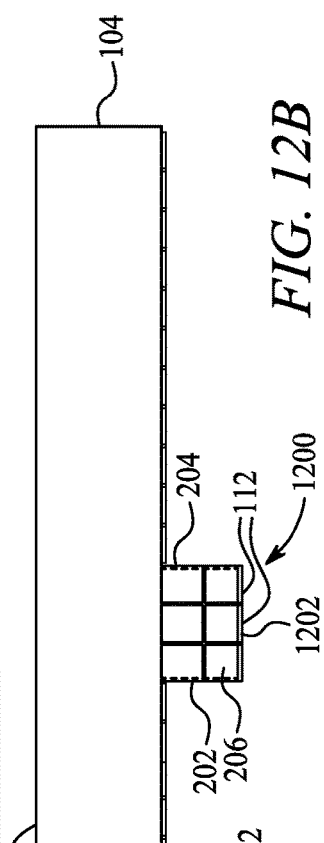

FLEXIBLE INTELLIGENT PARCEL LOCKER

BACKGROUND

Technical Field

The present disclosure is directed to a parcel locker, and particularly, relates to an intelligent flexible parcel locker that creates a protective package container based on dimension of a package to be stored therein.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Growth in the e-commerce industry has led to increase in parcel delivery volume which in turn led to challenges in fast and efficient delivery of parcels. Generally, parcel delivery includes a series of deliveries between an origin location and a destination location, which further includes, for example, a pick-up location, an intermediate hub, a destination hub, and a delivery address. The final delivery may have challenges if a consignee is not present at the delivery address to take delivery of the parcel. This may lead to multiple trips to the same delivery address to successfully deliver the parcel and such trips are associated with high cost. Therefore, an electronic parcel locker can be accessed for dropping off, storing and picking up various kinds of packages and such parcel locker may be located in a destination hub, warehouse or a public area so a delivery person or recipient can easily access the parcel. However, the conventional locker system includes dedicated containers of different sizes, and the interior space of the package container may not be effectively used. For an example, a large container may be used to store a significantly small parcel if there is no space available in the parcel locker, which results in inefficient space utilization of the locker system. Hence, there is a need for a parcel locker system having the ability to change the size of each parcel container based on a size of the parcel and which efficiently uses the overall parcel locker space.

US20150106292 describes a system for identifying a suitable locker for a particular package based on a size of the package. The system helps to identify smallest available locker that can accommodate the package based on the parcel size from the available lockers, however, the system lacks features to create a flexible locker based on the package size to accommodate the package.

US20190231105 describes an electronic parcel locker having side panels, a bottom panel, a top panel, and a back panel defining a front aperture. The locker includes an internal structure for supporting parcels deposited in the locker. The internal structure includes an array of bars disposed perpendicular to the back panel and movable between extended positions, where a front end of the array of bars is aligned with the front aperture, and retractable positions, where the bars of the array of bars corresponding to shapes of parcels to be deposited in the locker and form a temporary compartment to store the parcel. However, the locker lacks features to create multiple lockers of different sizes beyond a capacity of the locker defined by the side panels, the bottom panel, the top panel, and the back panel.

None of the aforementioned references suffers from one or more drawbacks, including lack of flexibility in creating package container space. Accordingly, it is one object of the present disclosure to provide methods and systems for providing a package container to accommodate each package based on the dimensions of the package as needed.

SUMMARY

In an exemplary embodiment, an intelligent parcel locker is described. The intelligent parcel locker includes a first side wall, a second side wall, a top wall, and a bottom wall. Each wall is perpendicularly oriented with respect to a back wall. The intelligent parcel locker further includes a plurality of front plates configured to form a front surface of the intelligent parcel locker and the plurality of front plates are connected to each other by a plurality of actuatable linking pins. The intelligent parcel locker further includes a plurality of sets of single vane rotary actuators. The plurality of single vane rotary actuators includes a first single vane rotary actuator including a plurality of linked first side plates. The first single vane rotary actuator is configured to dispense each linked first side plate such that each linked first side plate is parallel to the first side wall of the intelligent parcel locker. The plurality of single vane rotary actuators further includes a second single vane rotary actuator including a plurality of linked second side plates. The second single vane rotary actuator is configured to dispense each linked second side plate such that each linked second side plate is parallel to the second side wall of the intelligent parcel locker. The plurality of single vane rotary actuators further includes a third single vane rotary actuator including a plurality of linked top plates. The third single vane rotary actuator is configured to dispense each linked top plate such that each linked top plate is parallel to the top wall of the intelligent parcel locker. The plurality of single vane rotary actuators further includes a fourth single vane rotary actuator including a plurality of linked bottom plates. The fourth single vane rotary actuator is configured to dispense each linked bottom plate such that each linked bottom plate is parallel to the bottom wall of the intelligent parcel locker. The intelligent parcel locker includes a computing device connected to the plurality of sets of single vane rotary actuators and to the plurality of actuatable linking pins. The computing device is configured to receive a request to form a package container and generate a set of command signals to actuate a portion of the plurality of single vane rotary actuators to form the package container and actuate a portion of the plurality of actuatable linking pins to form a front door of the package container.

In another exemplary embodiment, a method for forming a package container in an intelligent parcel locker is described. The method includes receiving, by a computing device including a non-transitory computer readable medium having instructions stored therein and one or more processors configured to execute the instructions, a request to form the package container. The request includes a package dimension. The method further includes determining, by the computing device, a package container size based on the package dimension, determining, by the computing device, a location in the intelligent parcel locker to create the package container, determining, by the computing device, a pattern of front plates and a plurality of single vane rotary actuators that generates the package container, and generating, by the computing device, a set of command signals which actuate the plurality of single vane rotary actuators to form the package container.

In yet another exemplary embodiment, a non-transitory computer readable medium having instructions stored therein that, when executed by one or more processors, cause the one or more processors to perform a method for forming a package container in an intelligent parcel locker. The method includes receiving, by a computing device including a non-transitory computer readable medium having instructions stored therein and one or more processors configured to execute the instructions, a request to form the package container. The request includes a package dimension. The method further includes determining, by the computing device, a package container size based on the package dimension, determining, by the computing device, a pattern of front plates and a plurality of single vane rotary actuators which generate the package container, determining, by the computing device, a location in the intelligent parcel locker which includes the pattern of front plates and the sets of respective single vane rotary actuators which generate each package container based on a decision tree algorithm, generating, by the computing device, a set of command signals which actuate the plurality of single vane rotary actuators to form the package container, dispensing, by a first single vane rotary actuator, a plurality of linked first side plates which are parallel to a first side wall of the intelligent parcel locker, dispensing, by a second single vane rotary actuator, a plurality of linked second side plates which are parallel to a second side wall of the intelligent parcel locker, dispensing, by a third single vane rotary actuator, a plurality of linked top plates, which are parallel to a top wall of the intelligent parcel locker, dispensing, by a fourth single vane rotary actuator, a plurality of linked bottom plates, which are parallel to a bottom wall of the intelligent parcel locker, inserting a set of non-actuatable linking pins of an outermost linked plate of each of the plurality of linked first side plates and the plurality of linked second side plates into respective actuatable linking pin receptacles of a respective front plate, releasing a plurality of actuatable linking pins along a perimeter of the pattern of linked front plates, and continuing to dispense the plurality of linked first side plates, the plurality of linked second side plates, the plurality of linked top plates and the plurality of linked bottom plates until the package container matches the package container size.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1 is a schematic perspective view of an intelligent parcel locker, according to certain embodiments;

FIG. 10 is a schematic representation of a decision tree algorithm for selecting a package container in the intelligent parcel locker, according to certain embodiments;

FIG. 12A is a schematic perspective view of the intelligent parcel locker of FIG. 1 showing a package container, according to certain embodiments;

FIG. 12B is a schematic top view of the intelligent parcel locker of FIG. 12A, according to certain embodiments;

FIG. 12C is a schematic left side view of the intelligent parcel locker of FIG. 12A, according to certain embodiments;

DETAILED DESCRIPTION

Figure 2A:
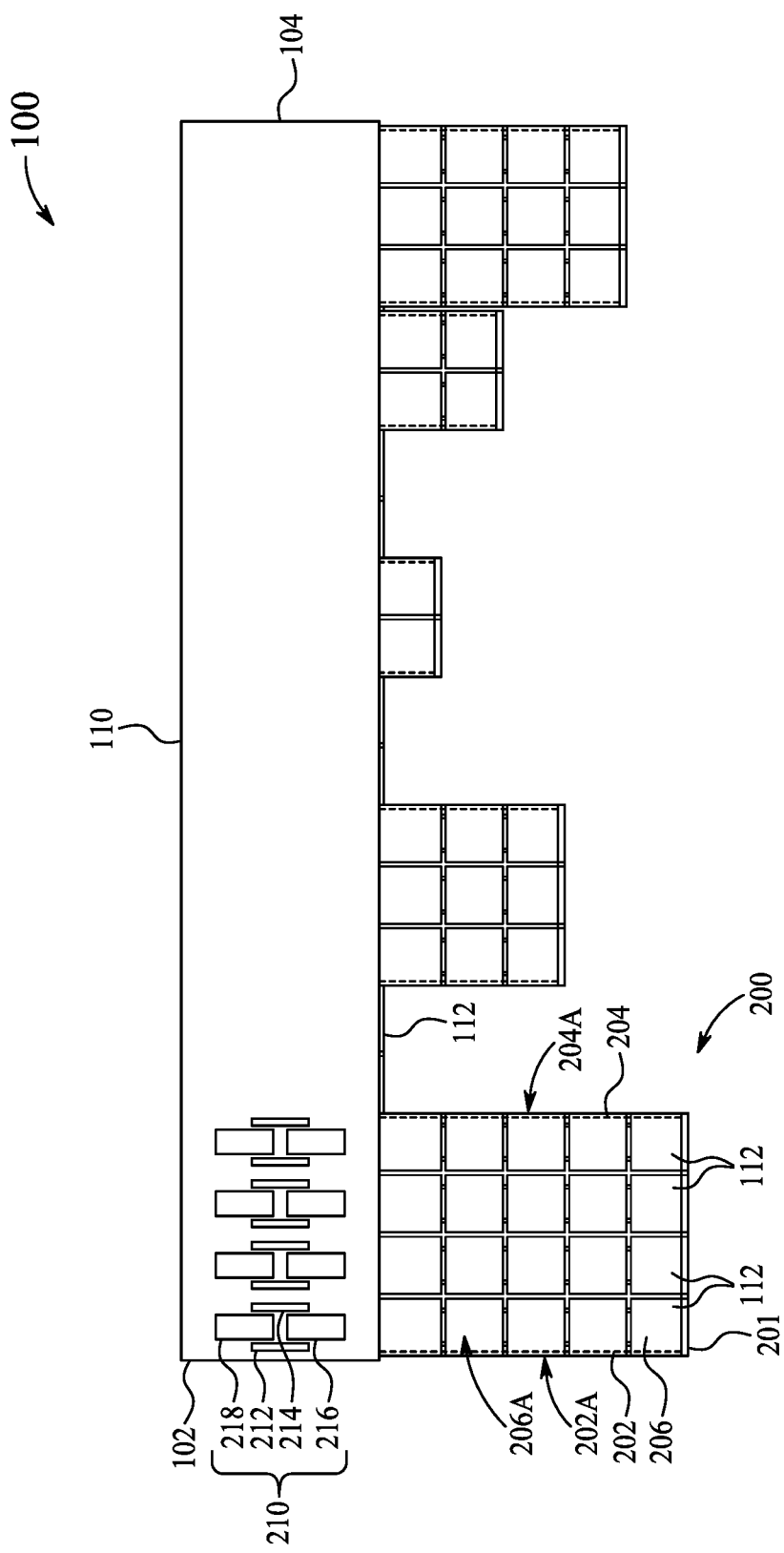
FIG. 2A is a schematic top view of the intelligent parcel locker of FIG. 1 showing five package containers of different sizes, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

In the present disclosure, the terms parcel and package are used interchangeably and have the same meaning.

Aspects of this disclosure are directed to an intelligent parcel locker and a method for forming a package container in the intelligent parcel locker. The intelligent parcel locker of the present disclosure includes strong and thin steel plates to form the package container and the steel plates are connected by flexible, actuatable locking pins so as to be foldable to accommodate a package of any size based on the package dimension. The intelligent parcel locker includes a plurality of front plates connected by a plurality of actuatable linking pins. The intelligent parcel locker further includes first single vane rotary actuators to dispense a plurality of linked first side plates, second single vane rotary actuators to dispense a plurality of linked second side plates, third single vane rotary actuators to dispense a plurality of linked top plates, and fourth single vane rotary actuators to dispense a plurality of linked bottom plates. The parcel locker further includes a computing device connected to the plurality of single vane rotary actuators and the actuatable linking pins, receives a request to form the container from a user, generates command signals to actuate the plurality of single vane rotary actuators to form the package container, and actuates the actuatable linking pins to form a front door of the package container. The intelligent parcel locker of the present disclosure helps to optimally utilize space to increase storage area by forming the package container based on the size of the package. The the intelligent parcel locker creates more space for additional packages, as the space will be used more effectively compared to traditional parcel lockers that are fixed, of standard shape and inflexible. Additionally, as the package containers are foldable, they will not take up lot of space when not in use.

Referring to FIG. 1, a schematic perspective view of an intelligent parcel locker 100 is illustrated, according to an aspect of the present disclosure. The intelligent parcel locker 100 includes a first side wall 102 having a top edge and a bottom edge, a second side wall 104 having a top edge and a bottom edge, a top wall 106 extending between the top edge of the first side wall 102 and the top edge of the second side wall 104, and a bottom wall 108 extending between the bottom edge of the first side wall 102 and the bottom edge of the second side wall 104. A depth and a height of the first side wall 102 and the second side wall 104 are equal. Similarly, a depth and a length of the top wall 106 and the bottom wall 108 are equal. The depth of the parcel locker is defined as parallel to the side walls 102 and 104. The intelligent parcel locker 100 further includes a back wall 110 connected to a rear edge of the first side wall 102, a rear edge of the second side wall 104, a rear edge of the top wall 106, and a rear edge of the bottom wall 108 such that each of the first side wall 102, the second side wall 104, the top wall 106, and the bottom wall 108 is perpendicularly oriented with respect to the back wall 110. As such, the first side wall 102, the second side wall 104, the top wall 106, the bottom wall 108, and the back wall 110 together form a cuboid shape for the intelligent parcel locker 100 to define a space therein and, thereby, to accommodate various operating elements of the intelligent parcel locker 100. In one aspect, each of the first side wall 102, the second side wall 104, the top wall 106, the bottom wall 108, and the back wall 110 may be detachably connected using fastening members. In another aspect, each of the first side wall 102, the second side wall 104, the top wall 106, the bottom wall 108, and the back wall 110 may be permanently connected using a welding method or a riveting method to form a single body. In an example, the intelligent parcel locker 100 may have a height of about 170 cm and a length of about 200 cm.

The intelligent parcel locker 100 further includes a plurality of front plates 112 configured to form a front surface 112A of the intelligent parcel locker 100. Each of the plurality of front plates 112 has equal side lengths, such as a square shape. In an example, a size of each plate may be about 10 cm×10 cm. Therefore, the intelligent parcel locker 100 having a size of about 170 cm×200 cm includes three hundred forty front plates 112. The plurality of front plates 112 are stacked together to define the front surface 112A of the intelligent parcel locker 100. Further, each of the plurality of front plates 112 is detachably attached to adjacent front plates 112 to define a package container based on a size of a package to be stored within the intelligent parcel locker 100. Further, the front plates 112 of the package container may be separated to form a front door for each package container. The size of the parcel locker is not limited to 170 cm×200 cm, and may be larger or smaller to fit within the constraints of an installation space.

The intelligent parcel locker 100 further includes a user interface 120 disposed near the first side wall 102 or the second side wall 104 at a location convenient to a user so that the user can easily access the user interface 120 to operate the intelligent parcel locker 100. The user interface 120 may include a keypad 122. As such, the user interface 120 is configured to receive at least one of a menu choice and a package dimension. The user interface 120 is further connected to a computing device 124 of the intelligent parcel locker 100. The intelligent parcel locker 100 further includes a display 126 connected to the computing device 124. The display 126 is configured to display at least one of a menu and on-screen prompts for the package information, otherwise referred to as the package dimension. The package information may include a size and dimensions of a package to be stored in a package container of the intelligent parcel locker 100 and a barcode or any other identification code corresponding to the package such that a package container having a size greater than or equal to a size of the package may be formed in the intelligent parcel locker 100 for storing the package.

In another embodiment, the computing device 124 may be connected by Bluetooth to a computer application on a user's smartphone, which shows the menu and on-screen prompts on a display of the smartphone. In an example, the user may download an application software developed by a shipping company associated with the intelligent parcel locker 100 and installed in the smartphone. The application software may be downloaded by the delivery person of the shipping company and the consignee such that the application software facilitates communication between the delivery person and the consignee regarding the package to be tracked. The information related to the package and the current status of the intelligent parcel locker 100 can be linked with the application software such that the application software may be programmed to identify an available space to generate a package container. The delivery person or the consignee may further access the identified package container in the intelligent parcel locker 100 based on a barcode associated with the parcel or the dimensions of the parcel. In an alternative embodiment, the computing device 124 may include a communication device and be configured to transmit wireless communication packets over the Internet to a server, a user's computer, laptop, smartphone, tablet or any other computing unit. The user may access a website or download a computer application which receives the package requirements and schedule a package container to be generated with a particular date, time, and duration of use. The package container generated may be accessible by a passcode that a delivery person or the user may enter to gain access to the parcel locker.

Figure 2B:
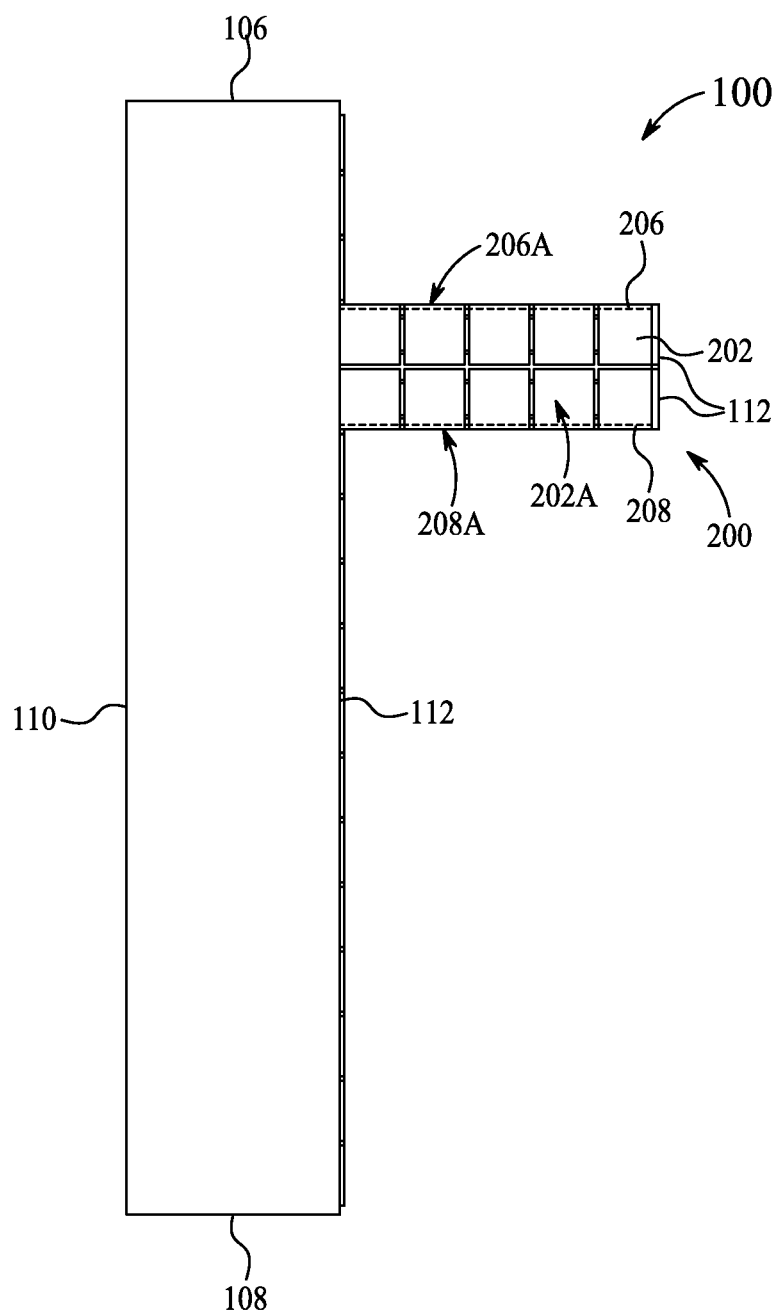
FIG. 2B is a schematic side view of the intelligent parcel locker of FIG. 2, according to certain embodiments.

Referring to FIG. 2A, a schematic top view of the intelligent parcel locker 100 of FIG. 1 having five packages of different sizes stored in corresponding five package containers is illustrated, according to an aspect of the present disclosure. As shown in FIG. 2A, a package container having a size slightly larger than a size of a package can be extracted from the intelligent parcel locker 100 to store the package. An exemplary package container, designated as 200, is discussed in detail for the illustration purpose of the present disclosure. Referring to FIG. 2B, a schematic side view of the intelligent parcel locker 100 having the five package containers of FIG. 2A is illustrated. In an example, the package container 200 may be formed from two rows of the front plates 112 and four columns of the front plates 112, forming a 20 cm×40 cm package container within the intelligent parcel locker 100. A depth of the 20 cm×40 cm package container is slightly larger than a depth of the package. Referring to FIG. 2A and FIG. 2B, the package container 200 includes the plurality of front plates 112 to define a front door 201. The package container 200 further includes a plurality of linked first side plates 202 configured to define a left surface 202A of the package container 200, a plurality of linked second side plates 204 configured to define a right surface 204A of the package container 200, a plurality of linked top plates 206 configured to define a top surface 206A of the package container 200, and a plurality of linked bottom plates 208 configured to define a bottom surface 208A of the package container 200. In the illustrated example of the package container 200, two sets each of the plurality of linked first side plates 202 and the linked second side plates 204, and four sets each of the plurality of linked top plates 206 and the linked bottom plates 208 are used. Further, each set of the plurality of linked first side plates 202, the linked second side plates 204, the linked top plates 206, and the linked bottom plates 208 includes five plates to define the package container 200 having a size of 20 cm height, 40 cm length, and 50 cm depth.

The intelligent parcel locker 100 further includes a plurality of single vane rotary actuators 210 configured to dispense the linked first side plates 202, the linked second side plates 204, the linked top plates 206, and the linked bottom plates 208 to define the package container 200. The plurality of single vane rotary actuators 210 includes a first single vane rotary actuator 212 configured to dispense each linked first side plate 202 such that each linked first side plate is parallel to the first side wall 102 of the intelligent parcel locker 100, a second single vane rotary actuator 214 configured to dispense each linked second side plate 204 such that each linked second side plate 204 is parallel to the second side wall 104 of the intelligent parcel locker 100, a third single vane rotary actuator 216 configured to dispense each linked top plate 206 such that each linked top plate 206 is parallel to the top wall 106 of the intelligent parcel locker 100, and a fourth single vane rotary actuator 218 configured to dispense each linked bottom plate 208 such that each linked bottom plate 208 is parallel to the bottom wall 108 of the intelligent parcel locker 100. One set of each of the plurality of linked first side plates 202, the plurality of linked second side plates 204, the plurality of linked top plates 206, and the plurality of linked bottom plates 208 are wrapped around the first single vane rotary actuator 212, the second single vane rotary actuator 214, the third single vane rotary actuator 216, and the fourth single vane rotary actuator 218, respectively. Each set of the plurality of single vane rotary actuators 210 may be actuated or suppressed for the movement of the linked first and second side plates 202, 204, the linked top plates 206 and the linked bottom plates 208 as necessary to form a package container with an interior cavity of a size configured to receive the package.

Figure 3:
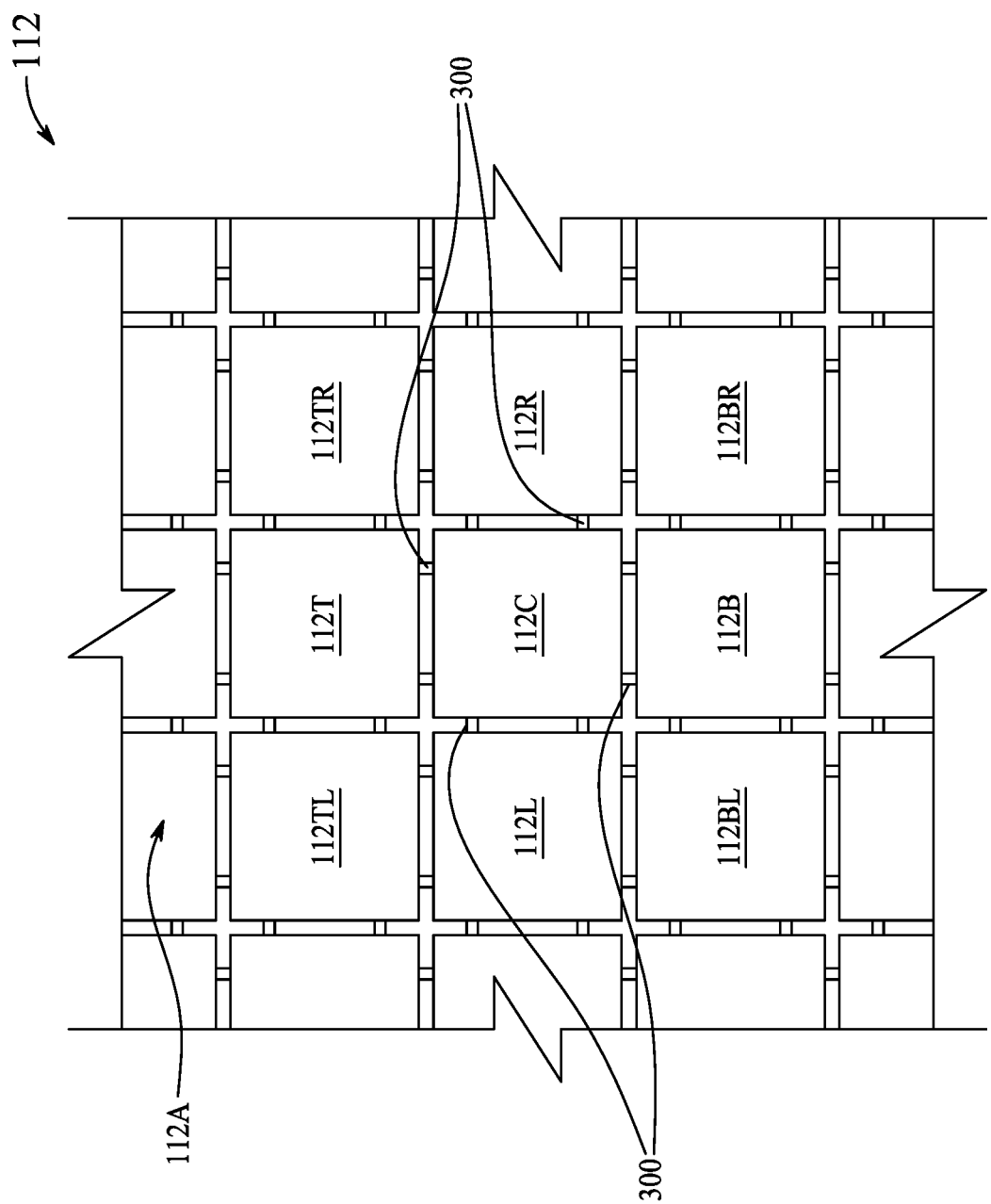
FIG. 3 is a schematic enlarged portion of a front surface of the intelligent parcel locker showing a plurality of front plates, according to certain embodiments.

Referring to FIG. 3, a portion of the front surface 112A of the intelligent parcel locker 100 showing some of the plurality of front plates 112 is illustrated, according to an aspect of the present disclosure. The plurality of front plates 112 are connected to each other by actuatable linking pins 300. Particularly, a front plate 112 is detachably connected to an adjacent front plate using a pair of actuatable linking pins 300. As shown in FIG. 3, a central front plate 112C is detachably connected to each of a right front plate 112R, a left front plate 112L, a top front plate 112T, and a bottom front plate 112B using the pair of actuatable linking pins 300. Further, the top front plate 112T and the left front plate 112L are detachably connected to a top left corner front plate 112TL, the top front plate 112T and the right front plate 112R are detachably connected to a top right corner front plate 112TR, the bottom front plate 112B and the left front plate 112L are detachably connected to a bottom left corner front plate 112BL, and the bottom front plate 112B and the right front plate 112R are detachably connected to a bottom right corner front plate 112BR. Thus, the plurality of front plates 112 are detachably connected to each other to form a package container having a size same or greater than a size of a package to be stored therein and form a front door for the package container.

Figure 4A:
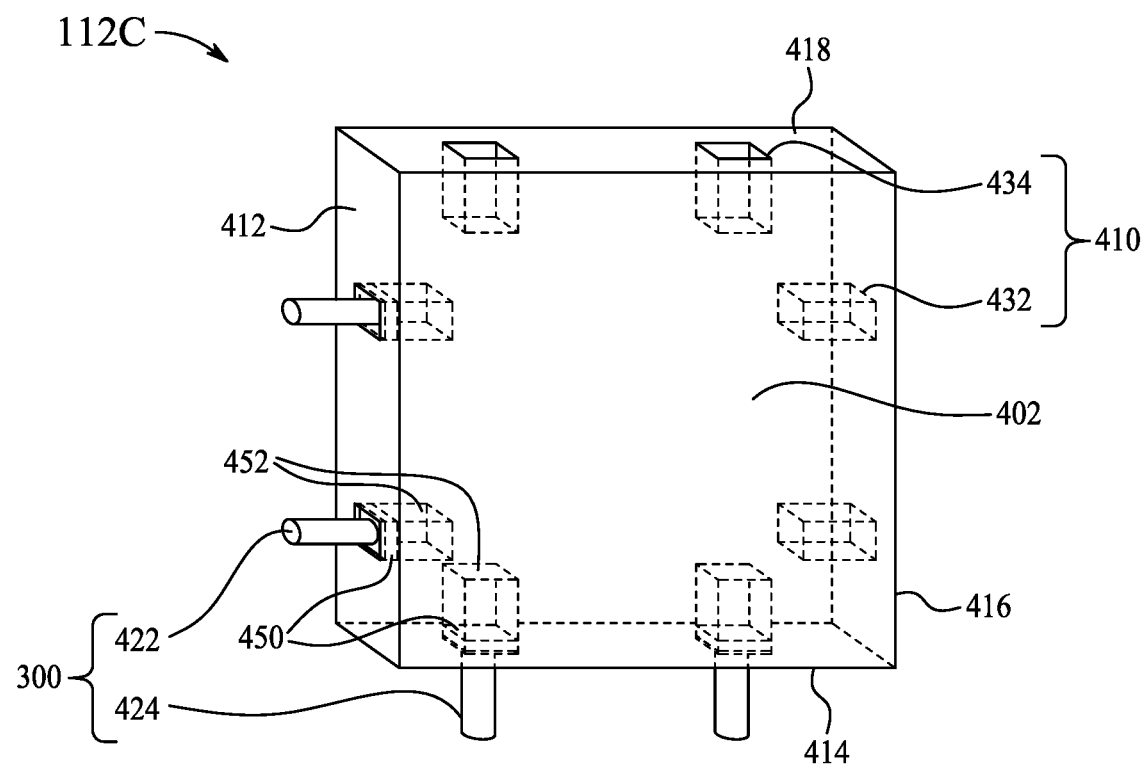
FIG. 4A is a schematic front perspective view of the front plate shown in FIG. 3, according to certain embodiments.
Figure 4B:
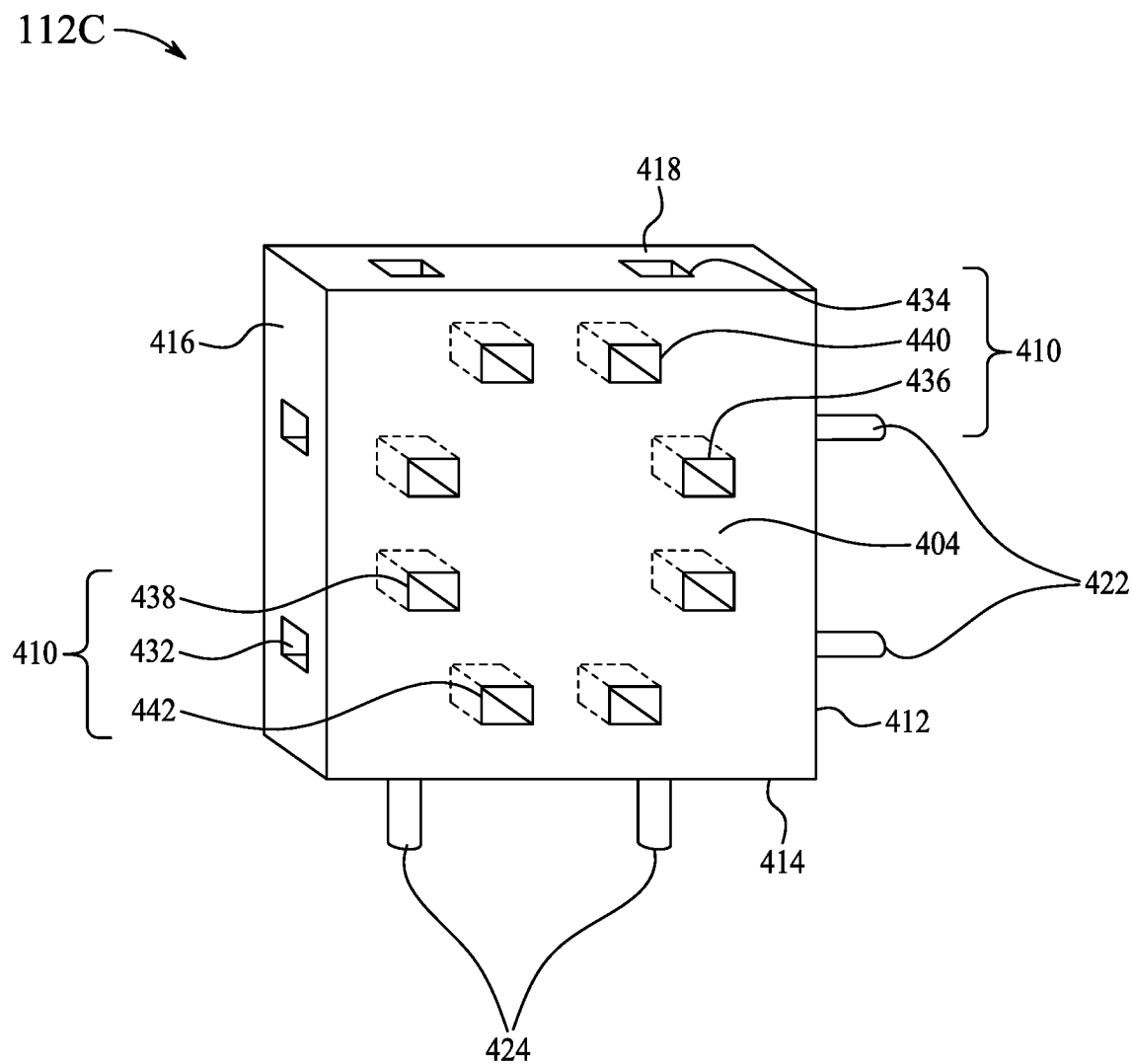
FIG. 4B is a schematic rear perspective view of the front plate of FIG. 4A, according to certain embodiments.

Referring to FIG. 4A and FIG. 4B, a front perspective view and a rear perspective view, respectively, of a front plate is illustrated, according to an aspect of the present disclosure. The central front plate 112C shown in FIG. 3, otherwise referred to as the front plate 112C, is discussed in detail for the illustration purpose of the present disclosure. The front plate 112C includes a front side 402 and a back side 404 having a plurality of actuatable linking pin receptacles 410. The front plate 112C further includes a first edge 412, a second edge 414 connected to and perpendicular to the first edge 412, a third edge 416 connected to the second edge 414 and is parallel to the first edge 412, and a fourth edge 418 connected to the third edge 416 and is parallel to the second edge 414. The front plate 112C further includes a first plurality of actuatable linking pins 422 which extend outward from the first edge 412 of the front plate 112C and a second plurality of actuatable linking pins 424 which extend outward from the second edge 414 of the front plate 112C.

The front plate 112C further includes a first plurality of actuatable linking pin receptacles 432 which extends inward from the third edge 416 of the front plate 112C. Each of the first plurality of actuatable linking pin receptacles 432 is configured to releasably retain actuatable linking pins of an adjacent front plate, such as the right front plate 112R as shown in FIG. 3. The front plate 112C further includes a second plurality of actuatable linking pin receptacles 434 which extend inward from the fourth edge 418 of the front plate 112C. Each of the second plurality of actuatable linking pin receptacles 434 is configured to releasably retain actuatable linking pins of an adjacent front plate, such as the top front plate 112T as shown in FIG. 3. The first plurality of actuatable linking pins 422 of the front plate 112C is further configured to engage with the first plurality of actuatable linking pin receptacles 432 of the left front plate 112L and the second plurality of actuatable linking pins 424 of the front plate 112C is configured to engage with second plurality of actuatable linking pin receptacles 434 of the bottom front plate 112B as shown in FIG. 3.

The front plate 112C further includes a third plurality of actuatable linking pin receptacles 436 which extends inward from the back side 404 of the front plate 112C adjacent to the first edge 412 thereof. The front plate 112C further includes a fourth plurality of actuatable linking pin receptacles 438 which extends inward from the back side 404 of the front plate 112C adjacent to the third edge 416 thereof. The front plate 112C further includes a fifth plurality of actuatable linking pin receptacles 440 which extends inward from the back side 404 of the front plate 112C adjacent to the fourth edge 418 thereof. The front plate 112C further includes a sixth plurality of actuatable linking pin receptacles 442 which extends inward from the back side 404 of the front plate 112C adjacent to the second edge 414 thereof.

In some aspects of the present disclosure, the computing device 124 is connected to each of the first plurality of actuatable linking pins 422 and the second plurality of actuatable linking pins 424 via an actuating mechanism 450 within each actuatable linking pin receptacle. Alternatively, the actuating mechanism 450 may be connected to the linking pin and extend or retract the actuatable linking pin. The first plurality of actuatable linking pins 422 and the second plurality of actuatable linking pins 424 are collectively referred to as the actuatable linking pins 300 and individually referred to as the actuatable linking pin 300 unless otherwise specifically mentioned. Also, the first plurality of actuatable linking pin receptacles 432, the second plurality of actuatable linking pin receptacles 434, the third plurality of actuatable linking pin receptacles 436, the fourth plurality of actuatable linking pin receptacles 438, the fifth plurality of actuatable linking pin receptacles 440, and the fourth plurality of actuatable linking pin receptacles 442 are collectively referred to as the actuatable linking pin receptacles 410 and individually referred to as the actuatable linking pin receptacle 410, unless otherwise specifically mentioned. The actuating mechanism 450 is configured to move the actuatable linking pin 300 between a first position and a second position based on a command signal from the computing device 124. In the first position of the actuatable linking pin 300, the actuatable linking pin 300 is configured to engage with the actuatable linking pin receptacles 410 of the adjacent front plate and in the second position, the front plate 112C is disconnected from the adjacent front plate to create a package container of required size.

As shown in FIG. 4A, one of the plurality of actuatable linking pins 300 provided on the first edge 412 of the front plate 112C is discussed in detail. The front plate 112C includes a receiving portion 452 configured to accommodate the actuatable linking pin 300 and the actuating mechanism 450. One end of the actuatable linking pin 300 is coupled to the actuating mechanism 450 and another end is configured to engage with the actuatable linking pin receptacle 410. In the second position of the actuatable linking pin 300, the actuatable linking pin 300 is entirely received within the receiving portion 452 and not visible outside the first edge 412 of the front plate 112C. The actuating mechanism 450 may communicate with the computing device 124 via a wired connection to receive the command signal from the computing device 124. The actuating mechanism 450 may move the actuatable linking pin 300 between the first position and the second position based on the inputs received from the user via the computing device 124. In one aspect of the present disclosure, the actuatable linking pin 300 may be an elongated rod. In some aspects, the actuatable linking pin 300 may be a pivot member attached to the first edge 412 of the front plate 112C.

Figure 5A:
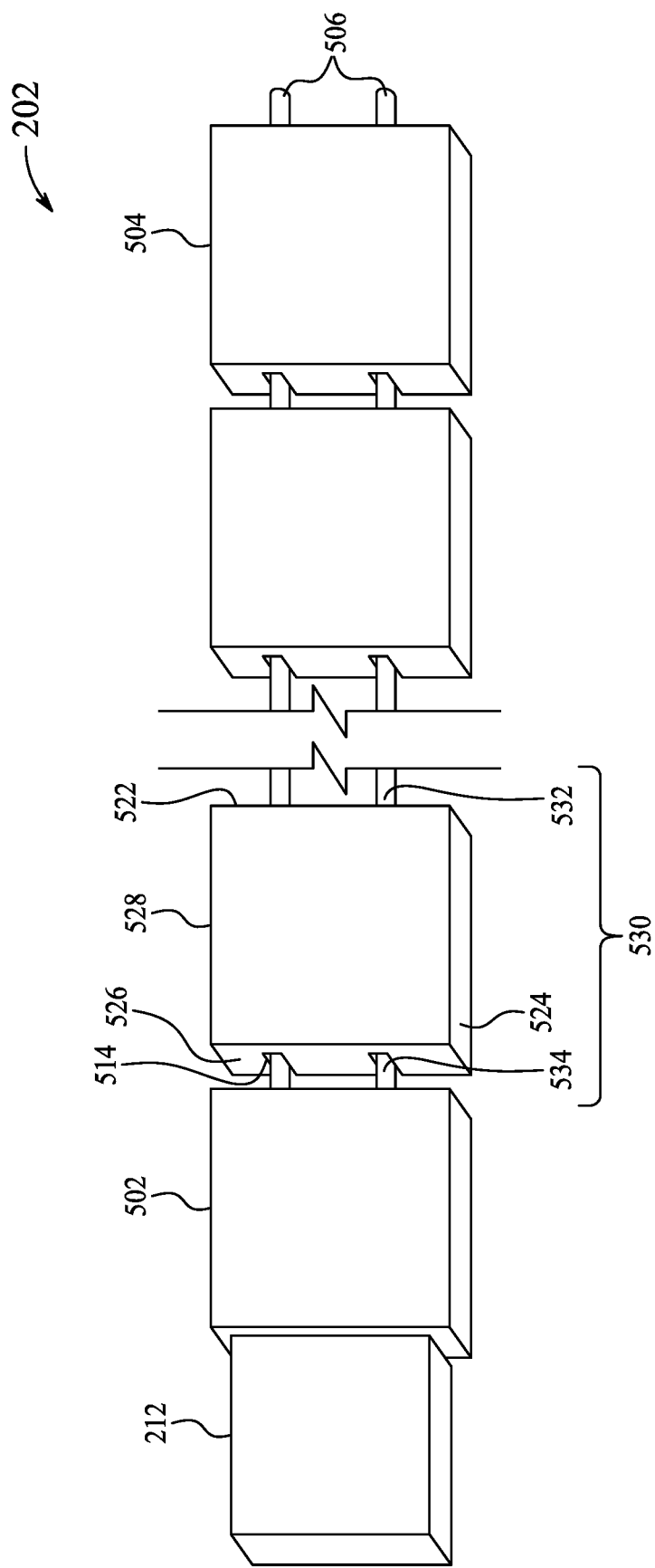
FIG. 5A is a schematic front perspective view of a set of linked first side plates shown in FIG. 2B, according to certain embodiments.
Figure 5B:
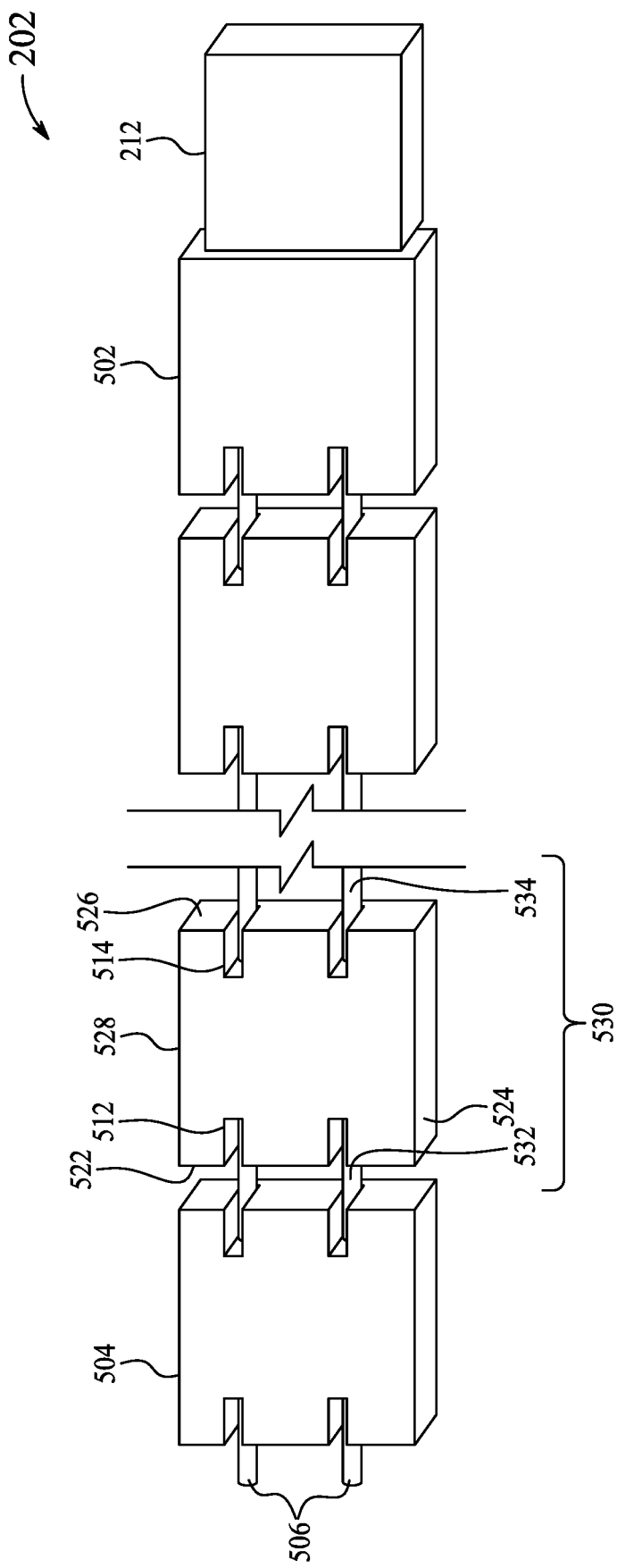
FIG. 5B is a schematic rear perspective view of the set of linked first side plates of FIG. 5A, according to certain embodiments.

Referring to FIG. 5A and FIG. 5B, a schematic front perspective view and a schematic rear perspective view, respectively, of a set of linked first side plates 202 is illustrated, according to an aspect of the present disclosure. The set of linked first side plates 202 includes an innermost linked first side plate 502, an outermost linked first side plate 504, and a plurality of linked first side plates 202 attached between the innermost linked first side plate 502 and the outermost linked first side plate 504. The innermost linked first side plate 502 and the outermost linked first side plate 504 are collectively referred to as the linked first side plates 202 and individually referred to as the linked first side plate 202 unless otherwise specifically mentioned. The innermost linked first side plate 502 is configured to attach with the first single vane rotary actuator 212 via fastening members. In some aspects of the present disclosure, the fastening members may be bolts and nuts, rivets, or any other fastening devices known in the art. The outermost linked first side plate 504 includes a plurality of connecting pins 506 configured to engage with the corresponding front plate 112. Particularly, the plurality of connecting pins 506 of the outermost linked first side plate 504 is configured to engage with the third plurality of actuatable linking pin receptacles 436. In one aspect, the plurality of connecting pins 506 may be fixedly attached to the outermost linked first side plate 504 and the third plurality of actuatable linking pin receptacles 436 may be provided with a holding mechanism to firmly engage with the connecting pins 506 of the outermost linked first side plate 504 to form a package container. In such a case, the holding mechanism may be communicated with the computing device 124 to actuate the holding mechanism based on the command signal received from the computing device 124. In another aspect, the plurality of connecting pins 506 may be movably attached to the outermost linked first side plate 504 and the third plurality of actuatable linking pin receptacles 436 may be provided with a locking mechanism to firmly engage with the connecting pins 506 of the outermost linked first side plate 504 to form a package container. In such a case, the computing device 124 may communicate with the connecting pins 506 to actuate the connecting pins 506 based on the command signal received from the computing device 124 to engage with the locking mechanism of the third plurality of actuatable linking pin receptacles 436.

As shown in FIG. 5B, each of the set of linked first side plates 202 includes a first plurality of non-actuatable linking pin receptacles 512 extending inward from a first edge 522 thereof and a second plurality of non-actuatable linking pin receptacles 514 extending inward from a third edge 526, which is parallel to the first edge 522 of the linked first side plate 202. The linked first side plate 202 further includes a second edge 524 and a fourth edge 528 connected to the first edge 522 and the third edge 526 and parallel to each other. The set of linked first side plates 202 further includes a plurality of non-actuatable linking pins 530 configured to pivotally couple two adjacent linked first side plates 202 such that the adjacent linked first side plates 202 are movable between 90 to 180 degrees. Particularly, each linked first side plate 202 includes a first plurality of non-actuatable linking pins 532 which extend outward from the first edge 522 of the linked first side plate 202 and a second plurality of non-actuatable linking pins 534 which extend outward from the third edge 526 of the linked first side plate 202. Further, the first plurality of non-actuatable linking pins 532 is partly received within the first plurality of non-actuatable linking pin receptacles 512 and the second plurality of non-actuatable linking pins 534 is partly received within the second plurality of non-actuatable linking pin receptacles 514. The first plurality of non-actuatable linking pins 532 and the second plurality of non-actuatable linking pins 534 are collectively referred to as the non-actuatable linking pins 532 and individually referred to as the non-actuatable linking pin 532 unless otherwise specifically mentioned.

Figure 6A:
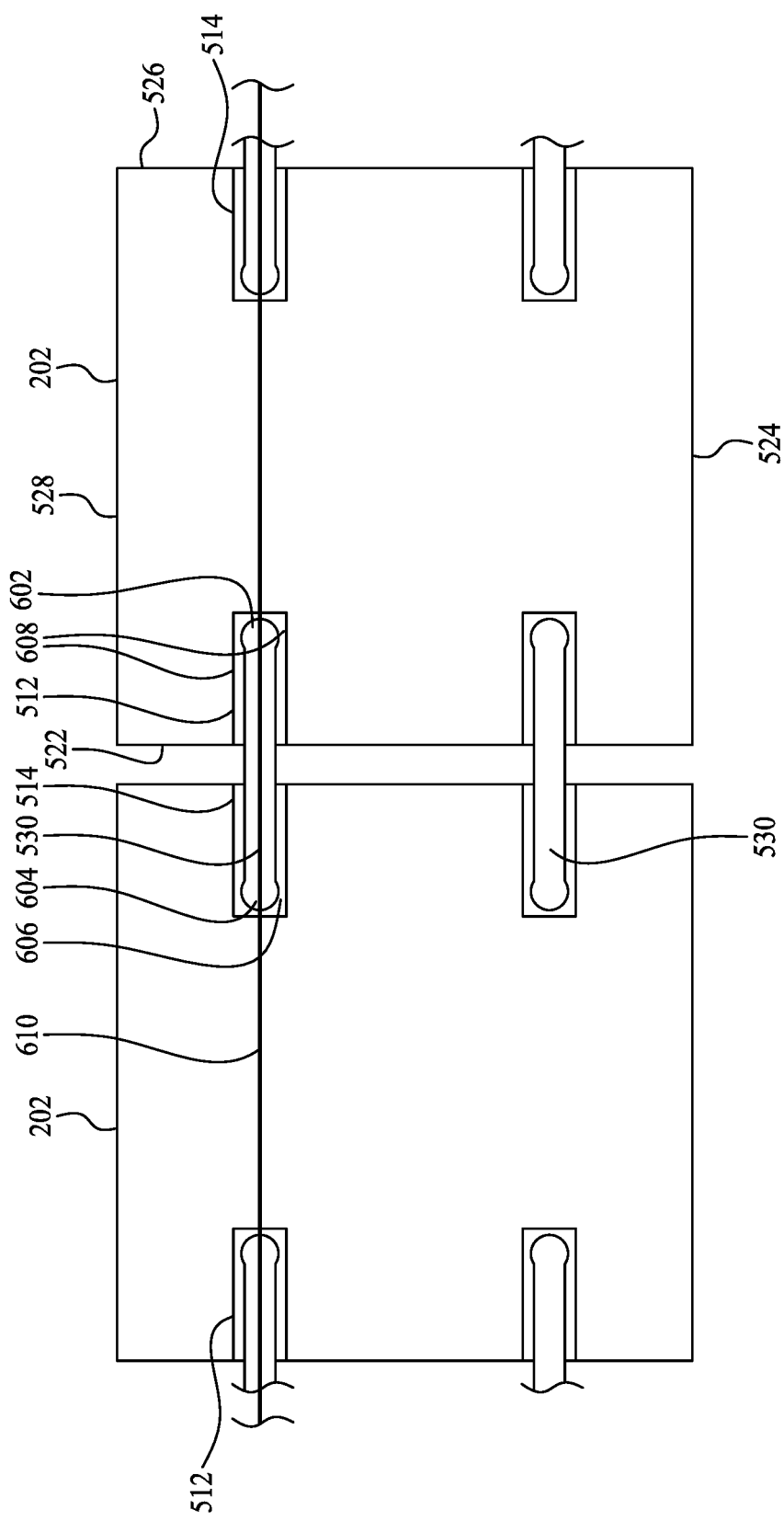
FIG. 6A is a schematic rear view of two adjacent linked first side plates of FIG. 5B showing coupling thereof with non-actuatable linking pins, according to certain embodiments.
Figure 6B:
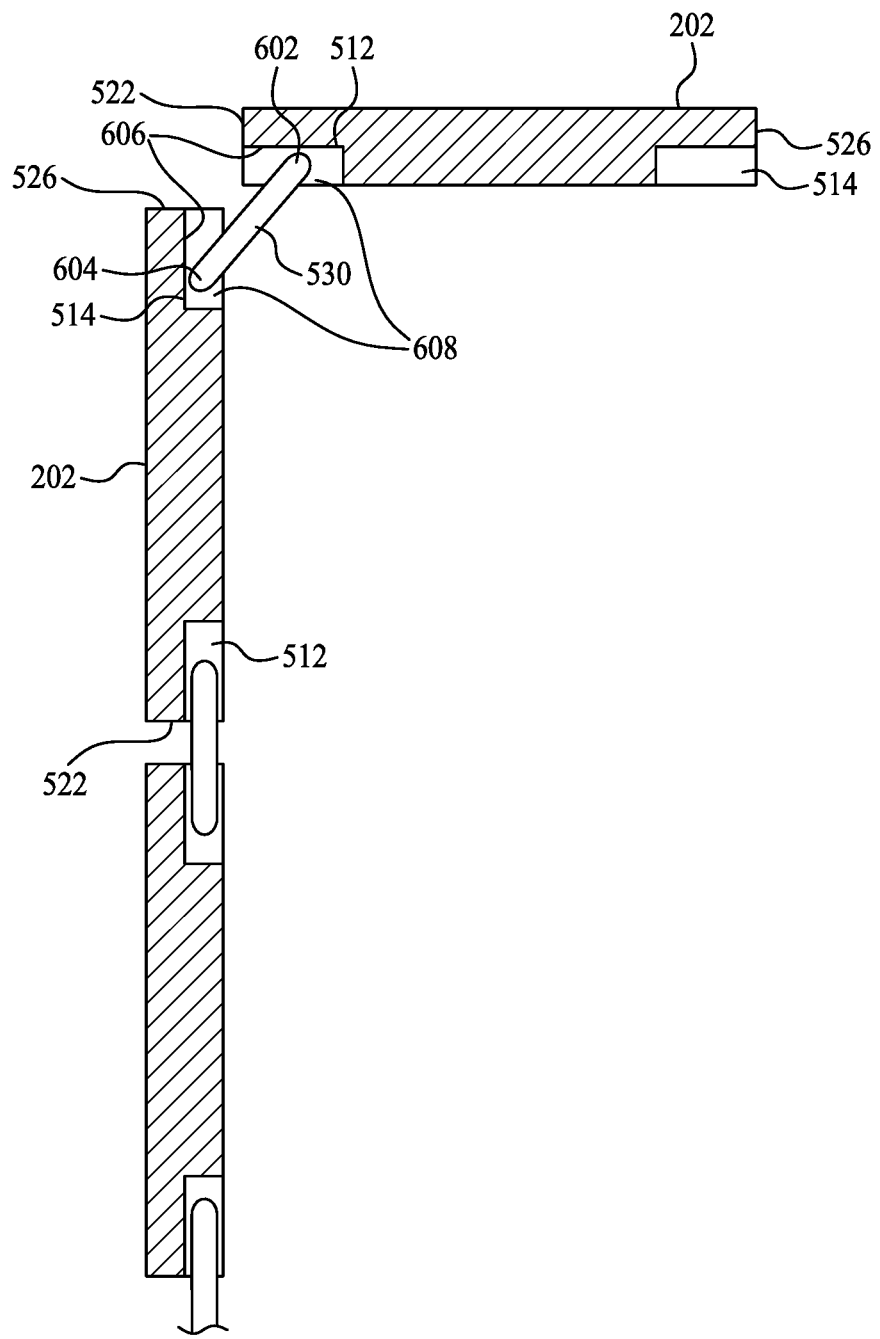
FIG. 6B is a schematic top view showing a cut-section of a portion of the set of linked first side plates and 90 degree orientation thereof, according to certain embodiments.

Referring to FIG. 6A, a rear view of the two adjacent linked first side plates 202 showing coupling thereof with the non-actuatable linking pins 530 is illustrated, according to an aspect of the present disclosure. The non-actuatable linking pin 530 includes a first end 602 received within the first non-actuatable linking pin receptacle 512 defined in the first edge 522 of a linked first side plate 202 and a second end 604 received within the second non-actuatable linking pin receptacle 514 defined in the third edge 526 of an adjacent linked first side plate 202. A length of each of the first non-actuatable linking pin receptacle 512 and the second non-actuatable linking pin receptacle 514 is equal to or less than a half of a length of the non-actuatable linking pin 530. Further, each of the first non-actuatable linking pin receptacle 512 and the second non-actuatable linking pin receptacle 514 may be defined as a groove having a bottom surface 606 and a pair of side surfaces 608. The first end 602 of the non-actuatable linking pin 530 is pivotally coupled to the bottom surface 606 of the first non-actuatable linking pin receptacle 512 and the second end 604 of the non-actuatable linking pin 530 is pivotally coupled to the bottom surface 606 of the second non-actuatable linking pin receptacle 514 such that the linked first side plates allow 90 degree movement, as shown in FIG. 6B, while restricted at 180 degree. FIG. 6B illustrates a top view showing a cut-section of a portion of the set of linked first side plates 202. Particularly, the bottom surface 606 of the first non-actuatable linking pin receptacle 512 and the second non-actuatable linking pin receptacle 514 restricts movement of the adjacent linked first side plates 202 beyond 180 degrees as the non-actuatable linking pin 530 is aligned straight with the bottom surfaces 606 of the first non-actuatable linking pin receptacle 512 and the second non-actuatable linking pin receptacle 514. Further, the first edge 522 and the third edge 526 of the adjacent linked first side plates 202 may be aligned close to each other in 180 degrees to restrict movement beyond 180 degrees.

In some aspects of the present disclosure, the linked first side plate 202 includes a plurality of linking pins which extends outward from the second edge 524 of the linked first side plate 202. The second edge 524 is connected to and perpendicular to the first edge 522. The linked first side plate 202 further includes a plurality of linking pin receptacles which extend inward from the fourth edge 528 of the linked first side plate 202. The fourth edge 528 is connected to the third edge 526 and is parallel to the second edge 524. The plurality of linking pins may be configured to engage with the plurality of linking pin receptacles of the adjacent linked first side plate during formation of a package container. In such a case, the plurality of linking pins and the plurality of linking pin receptacles may act like the plurality of actuatable linking pins 300 and the plurality of actuatable linking pin receptacles 410 of the front plates 112. Further, the plurality of linking pins or the plurality of linking pin receptacles may communicate with the computing device 124 to detachably couple the two adjacent sets of linked first side plates 202.

Each of the linked second side plate 204, the linked top plate 206, and the linked bottom plate 208 are designed and structured identically to the linked first side plate 202 and the each set of the linked second side plates 204, the linked top plates 206, and the linked bottom plates 208 are identical to the set of linked first side plates 202 explained with reference to FIG. 5A, FIG. 5B, FIG. 6A, and FIG. 6B, therefore, detailed description of the set of linked second side plates 204, the linked top plates 206, and the linked bottom plates 208 is avoided for brevity in explanation. Further, the reference numerals 502 and 504 may be assigned to the innermost and the outermost linked plates, respectively, of each of the set of the linked second side plates 204, the linked top plates 206, and the linked bottom plates 208. In some aspects of the present disclosure, an electrical connector 610 may be located within each linked first side plate 202, each linked second side plate 204, each linked top plate 206 and each linked bottom plate 208. The electrical connector 610 extends from each non-actuatable linking pin 530 to a respective actuatable linking pin receptacle 410 of the corresponding front plate 112. In one aspect, as shown in FIG. 6A, the electrical connector 610 may be a wired connector running through the linked first side plates 202 via the non-actuatable linking pins 530. In another aspect, each linked first side plate 202 may include a socket which is further connected by insulated wire to carry the current through the set of linked first side plates 202 to the actuatable linking pin receptacle 410 of the corresponding front plate 112. The electrical connector 610, each non-actuatable linking pin 530, and each respective actuatable linking pin receptacles 410 are configured to receive the command signals from the computing device 124 and transfer the command signals through each linked first side plate 202, each linked second side plate 204, each linked top plate 206 and each linked bottom plate 208 to the actuatable linking pin receptacles 410 of the corresponding front plate 112 via the connecting pins 506.

Figure 7A:
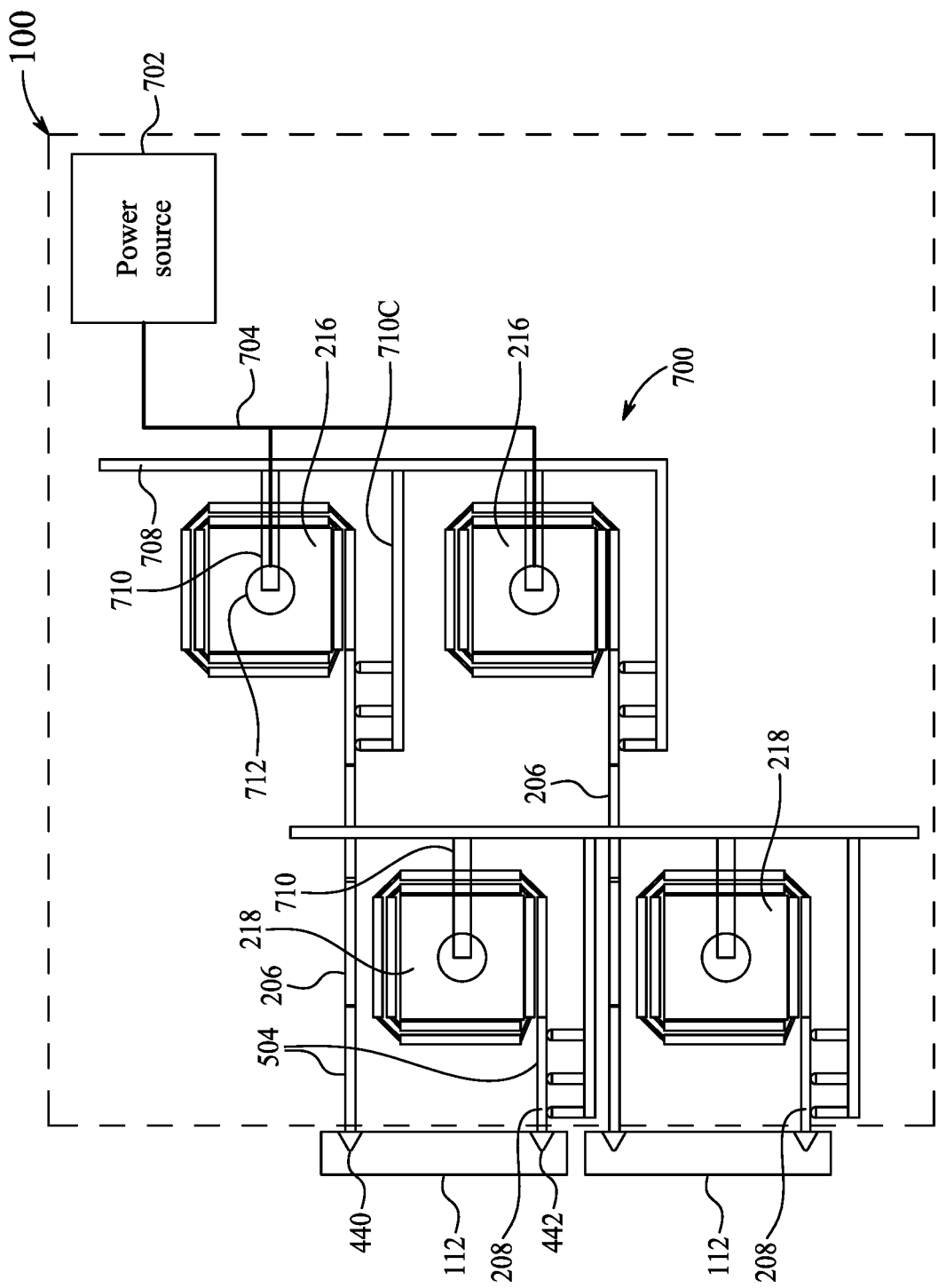
FIG. 7A a schematic side view of a portion of the intelligent parcel locker showing a set of linked top plates and a set of linked bottom plates, according to certain embodiments.

Referring to FIG. 7A, a schematic side view of a portion of the intelligent parcel locker 100 showing a set of linked top plates 206 and a set of linked bottom plates 208 is illustrated, according to an aspect of the present disclosure. The outermost linked top plate 504 is connected to the fifth plurality of actuatable linking pin receptacles 440 of the front plate 112 and the innermost linked top plate 502 is connected to the third single vane rotary actuator 216. Similarly, the outermost linked bottom plate 504 is connected to the sixth plurality of actuatable linking pin receptacles 442 of the front plate 112 and the innermost linked bottom plate 502 is connected to the fourth single vane rotary actuator 218. Each individual front plate 112 is associated with a set of the linked first side plates 202, a set of the linked second side plates 204, a set of the linked top plates 206, a set of the linked bottom plates 208, however, the set of linked first side plates 202 and the linked second side plates 204 are not shown in FIG. 7A for the ease of explaining the constructional arrangement of linked top plates 206 and the linked bottom plates 208. The intelligent parcel locker 100 further includes a support structure 700 located therein. The support structure 700 includes a wiring harness 704 connected to a power source 706 and the computing device 124. The wiring harness 704 is configured to transmit the command signals from the computing device 124 to the plurality of single vane rotary actuators 210. The support structure 700 is disposed within the space defined by the first side wall 102, the second side wall 104, the bottom wall 108, the top wall 106, and the back wall 110 of the intelligent parcel locker 100. In some aspects, the support structure 700 includes a grid structure of support bars 708 connected to the back wall 110 and a plurality of support arms 710 connected perpendicularly to the grid structure. The plurality of support arms 710 are configured to rotatably support the third and the fourth single vane rotary actuators 216, 218. In some aspects, the support structure 700 may be supported on the first side wall 102, the second side wall 104, the top wall 106, the bottom wall 108, and the back wall 110, and the plurality of support arms 710 may be perpendicularly connected to the grid structure of support bars 708. In one aspect, the power source 706 may be located within the space of the intelligent parcel locker 100 defined by the first side wall 102, the second side wall 104, the bottom wall 108, the top wall 106, and the back wall 110. In another aspect, the power source 706 may be located outside the intelligent parcel locker 100, in such a case a connector may be provided on one of the first side wall 102, the second side wall 104, the bottom wall 108, the top wall 106, and the back wall 110 to electrically couple with the power source 706.

Figure 7B:
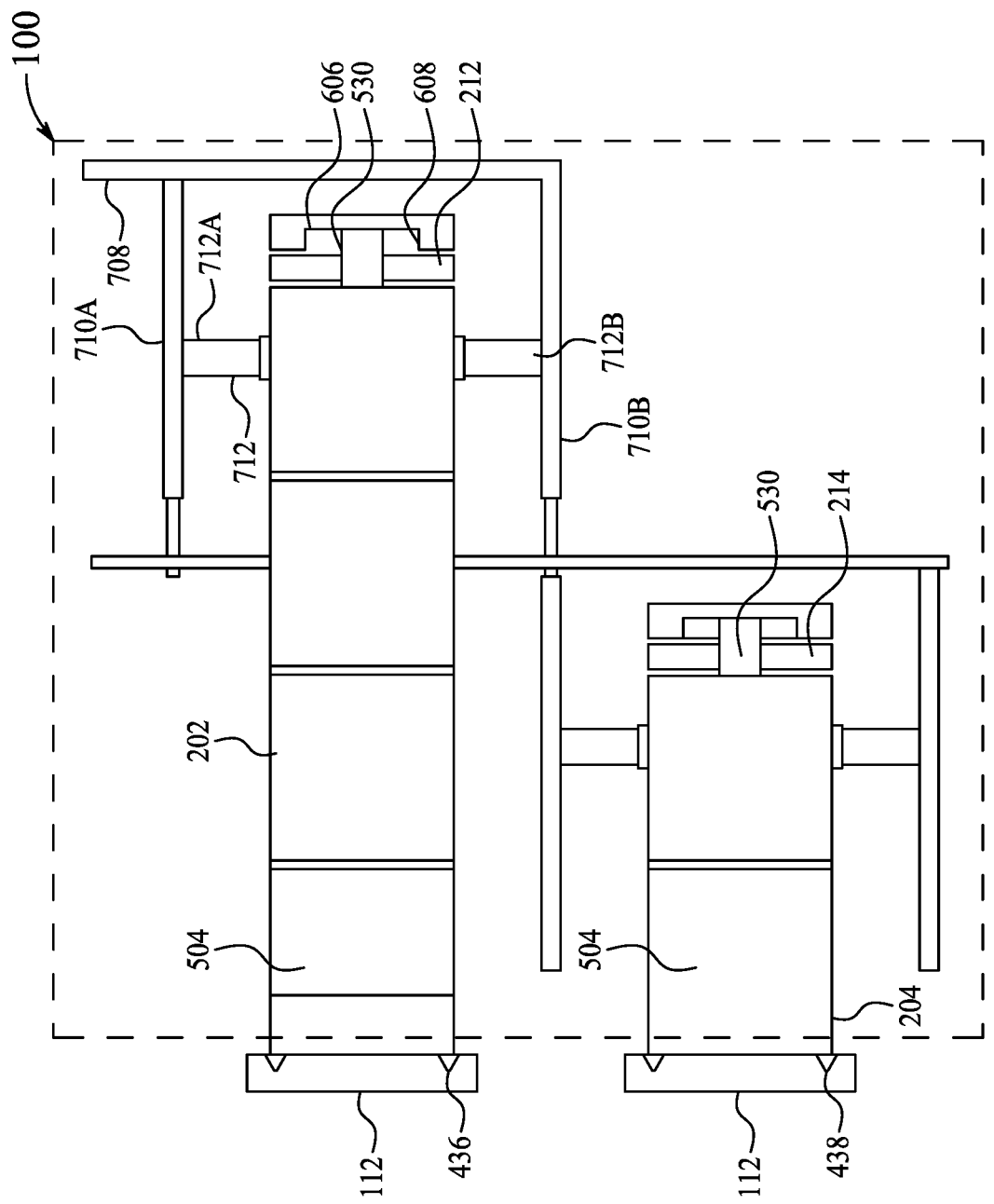
FIG. 7B is a schematic side view of a portion of the intelligent parcel locker showing a set of linked first side plates and a set of linked second side plates, according to certain embodiments.

Referring to FIG. 7B, a schematic side view of a portion of the intelligent parcel locker 100 showing a set of linked first side plates 202 of one row of front plates and a set of linked second side plates 204 of a subsequent row of front plates is illustrated, according to an aspect of the present disclosure. The set of linked top plates 206 and the linked bottom plates 208 are not shown in FIG. 7B for the ease of explaining the constructional arrangement of linked first side plates 202 and the linked second side plates 204. The outermost linked first side plate 504 is connected to the third plurality of actuatable linking pin receptacles 436 of the front plate 112 and the innermost linked first side plate 502 is connected to the first single vane rotary actuator 212. Similarly, the outermost linked second side plate 504 is connected to the fourth plurality of actuatable linking pin receptacles 438 of the front plate 112 and the innermost linked second side plate 502 is connected to the second single vane rotary actuator 214. The plurality of support arms 710 of the support structure 700 is configured to rotatably support the first and second single vane rotary actuators 212, 214. In a normal position of the front plates 112 in the intelligent parcel locker 100, each single vane rotary actuator 210 is wrapped with the respective plurality of linked plates and is configured to dispense its respective plurality of linked plates by rotating each linked plate from a first orientation to a second orientation perpendicular to the first orientation. Particularly, in the normal position of the front plates 112, the set of linked first side plates 202 is wrapped around the first single vane rotary actuator 212 and the first single vane rotary actuator 212 is configured to dispense each linked first side plate 202 by rotating the linked first side plate 202 from the first orientation to the second orientation perpendicular to the first orientation. The first orientation may be defined as a position of a linked first side plate 202 when wrapped around the first single vane rotary actuator 212 and the second orientation may be defined as a position of the linked first side plate 202 moved away from the first single vane rotary actuator 212 immediately after the position of the linked first side plate 202 wrapped around the first single vane rotary actuator 212. As such, the second orientation of the linked first side plate 202 is perpendicular to the first orientation thereof. Similarly, the set of linked second side plates 204 is wrapped around the second single vane rotary actuator 214, the set of linked top plates 206 is wrapped around the third single vane rotary actuator 216, and the set of linked bottom plates 208 is wrapped around the fourth single vane rotary actuator 218.

Referring to FIG. 7A and FIG. 7B, the intelligent parcel locker 100 further includes a drive shaft 712 connected to each single vane rotary actuator 210. Each drive shaft 712 includes a first end 712A and a second end 712B which are connected to a first support arm 710A and a second support arm 710B, respectively, of the plurality of support arms 710. The first support arm 710A and the second support arm 710B are collectively referred to as the support arms 710 and individually referred to as the support arm 710 unless otherwise specifically mentioned. In an example, the first single vane rotary actuator 212 includes the first drive shaft 712 having the first end 712A connected to the first support arm 710A and the second end 712B connected to the second support arm 710B. Particularly, the first drive shaft 712 may be rotatably coupled to the first support arm 710A and the second support arm 710B. Similarly, the drive shaft 712 of each of the second single vane rotary actuator 214, the third single vane rotary actuator 216, and the fourth single vane rotary actuator 218 is rotatably supported on the respective pair of support arms 710. The power source 706 located within the intelligent parcel locker 100 is connected to each single vane rotary actuator 210 through the wiring harness 704.

The intelligent parcel locker 100 further includes a third support arm 710C associated with the first support arm 710A and the second support arm 710B. The third support arm 710C is located below each single vane rotary actuator 210 and connected to the support structure 700. The first support arm 710A, the second support arm 710B, and the third support arm 710C are together configured to dispense each linked plate effectively via the single vane rotary actuator 210. Particularly, the third support arm 710C is configured to support and align movement of the linked plates along a straight direction.

Figure 7C:
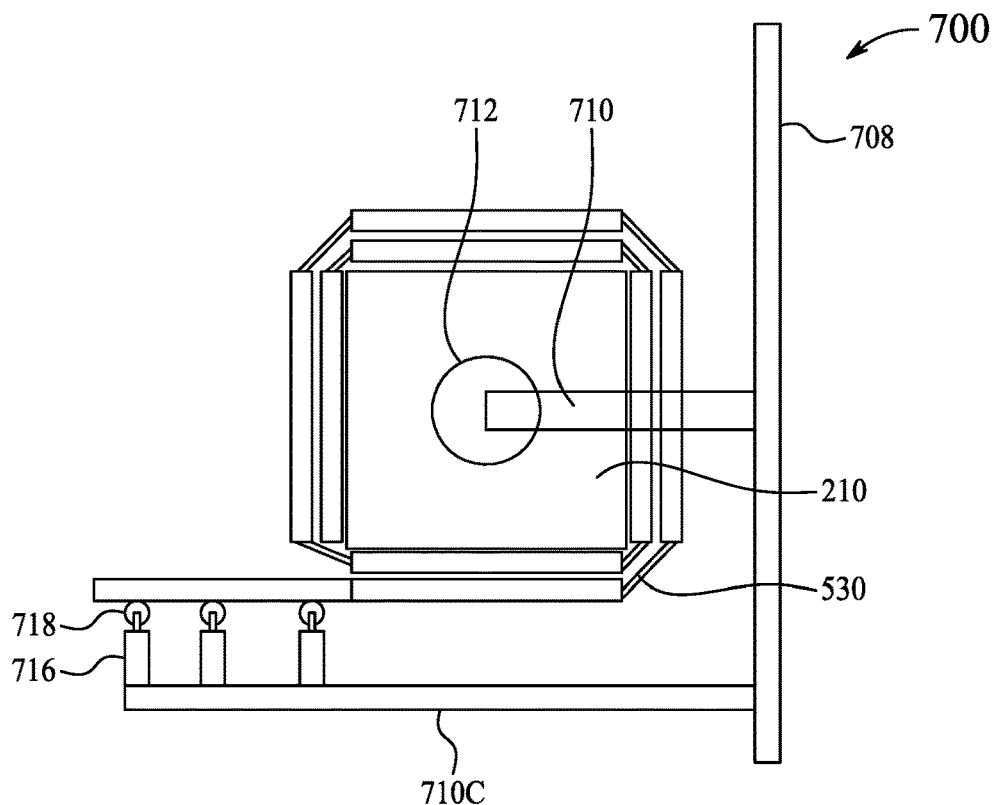
FIG. 7C is a schematic side view of a portion of the intelligent parcel locker showing a wheel located on a strut of a supporting arm for supporting the linked plates during movement thereof, according to certain embodiments.
Figure 7D:
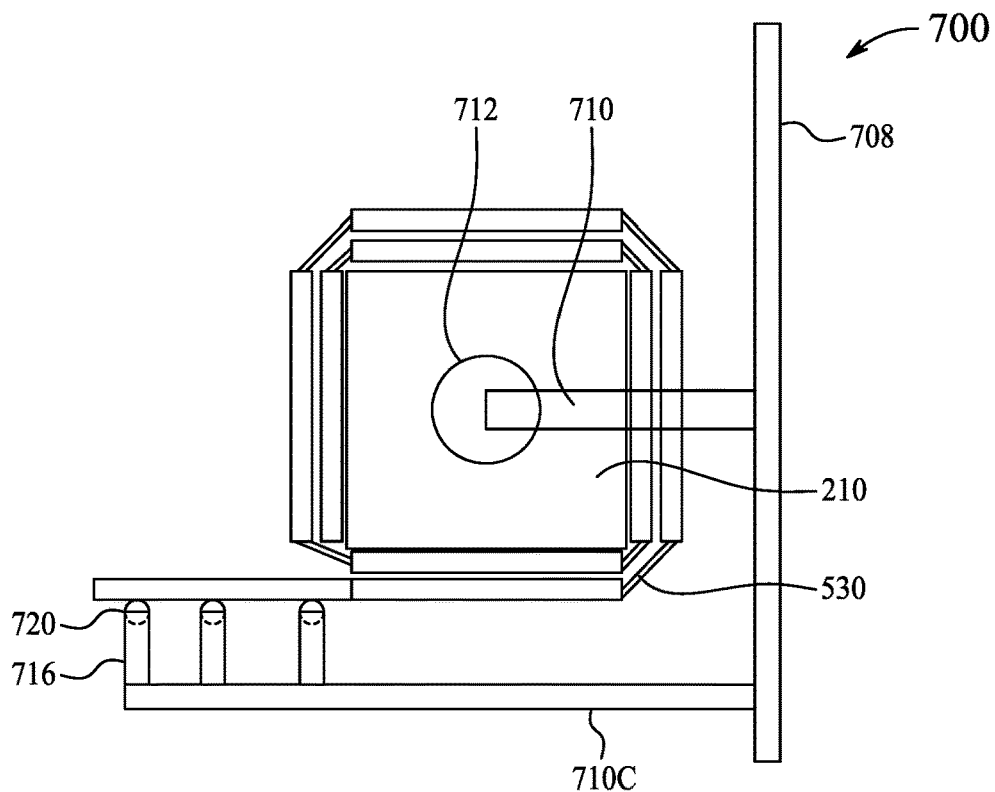
FIG. 7D is a schematic side view of a portion of the intelligent parcel locker showing a roller bearing located on the strut of the supporting arm, according to certain embodiments.

The support structure 700 further includes a plurality of struts 716 located on each third support arm 710C below each single vane rotary actuator 210. The plurality of struts 716 may be disposed on the third support arm 710C based on dimensional specifications of the linked plates. In one aspect, as shown in FIG. 7C, a wheel 718 is located on an end of each strut 716 and is configured to support and guide the linked plates as they exits the respective single vane rotary actuator 210. In another aspect, as shown in FIG. 7D, a roller bearing 720 is located on an end of each strut 716, and is configured to support and guide the linked plates as they exits the respective single vane rotary actuator 210.

Figure 8:
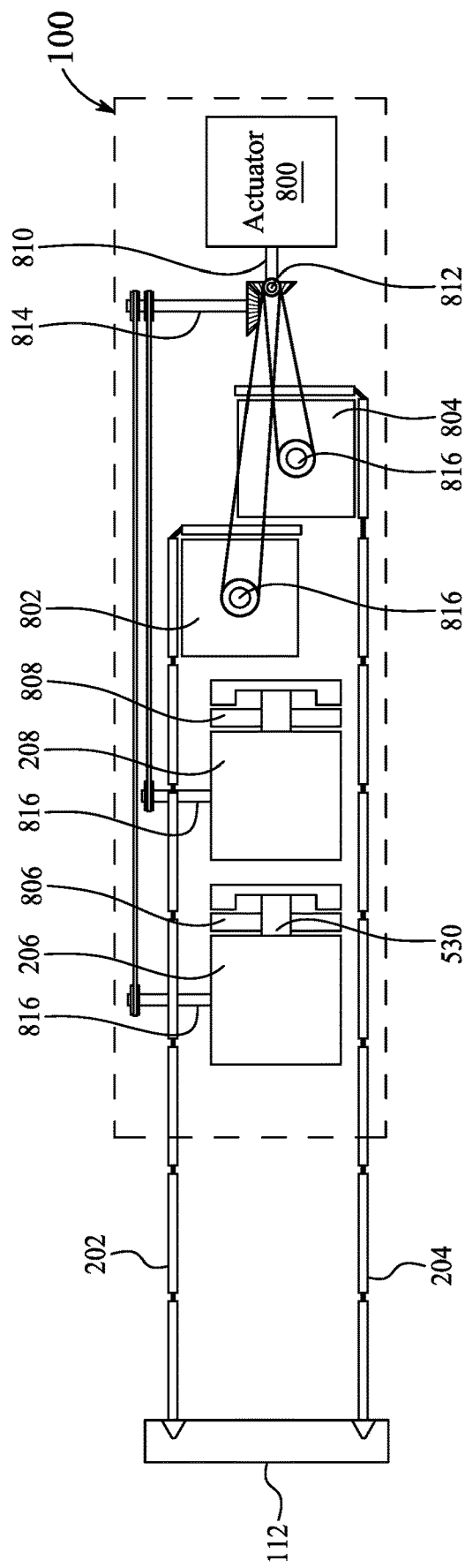
FIG. 8 is a schematic side view illustrating movements of a set of linked first side plates, a set of linked second side plates, a set of linked top plates, and a set of linked bottom plates using a single actuator, according to certain embodiments.

Referring to FIG. 8, a schematic side view of a portion of the intelligent parcel locker 100 showing movements of a set of linked first side plates 202, a set of linked second side plates 204, a set of linked top plates 206, and a set of linked bottom plates 208 by a single actuator 800 is illustrated, according to an aspect of the present disclosure. Each set of the linked first side plates 202, the linked second side plates 204, the linked top plates 206, and the linked bottom plates 208 are wrapped around a first rotary member 802, a second rotary member 804, a third rotary member 806, and a fourth rotary member 808, respectively. The intelligent parcel locker 100 includes a central drive shaft 810 having a first end coupled with the actuator 800. The actuator 800 may be a rotary power source such as an electric motor. A second end of the central drive shaft 810 may include a bevel gear. The intelligent parcel locker 100 further includes a first pinion gear shaft 812 and a second pinion gear shaft 814 rotatably engaged with the bevel gear of the central drive shaft 810. The first pinion gear shaft 812 is further rotatably supported on the support structure 700 and rotatably engaged with a drive shaft 816 of each of the first and second rotary members 802, 804. Similarly, the second pinion gear shaft 814 is further rotatably supported on the support structure 700 and rotatably engaged with a drive shaft 816 of each of the third and fourth rotary members 806, 808. In one aspect, the first pinion gear shaft 812, the second pinion gear shaft 814, and the drive shaft 816 of each of the first, second, third and fourth rotary members 802, 804, 806, 808 may include a pulley and a belt arrangement such that the rotary power from the central drive shaft 810 is transmitted to the drive shaft 816 of the first, second, third and fourth rotary members 802, 804, 806, 808. In another aspect, the first pinion gear shaft 812, the second pinion gear shaft 814 and the drive shaft 816 of each of the first, second, third and fourth rotary members 802, 804, 806, 808 may include a chain and a sprocket arrangement such that the rotary power from the central drive shaft 810 is transmitted to the drive shaft 816 of the first, second, third and fourth rotary members 802, 804, 806, 808. Further, the drive shaft 816 of each of the first, second, third and fourth rotary members 802, 804, 806, 808 may include a clutch mechanism such that the drive shaft 816 of each of the first, second, third and fourth rotary members 802, 804, 806, 808 may be selectively operated by the computing device 124 to actuate one or more of the first, second, third and fourth rotary members 802, 804, 806, 808 based on the size requirements of a package container to be formed.

Figure 9:
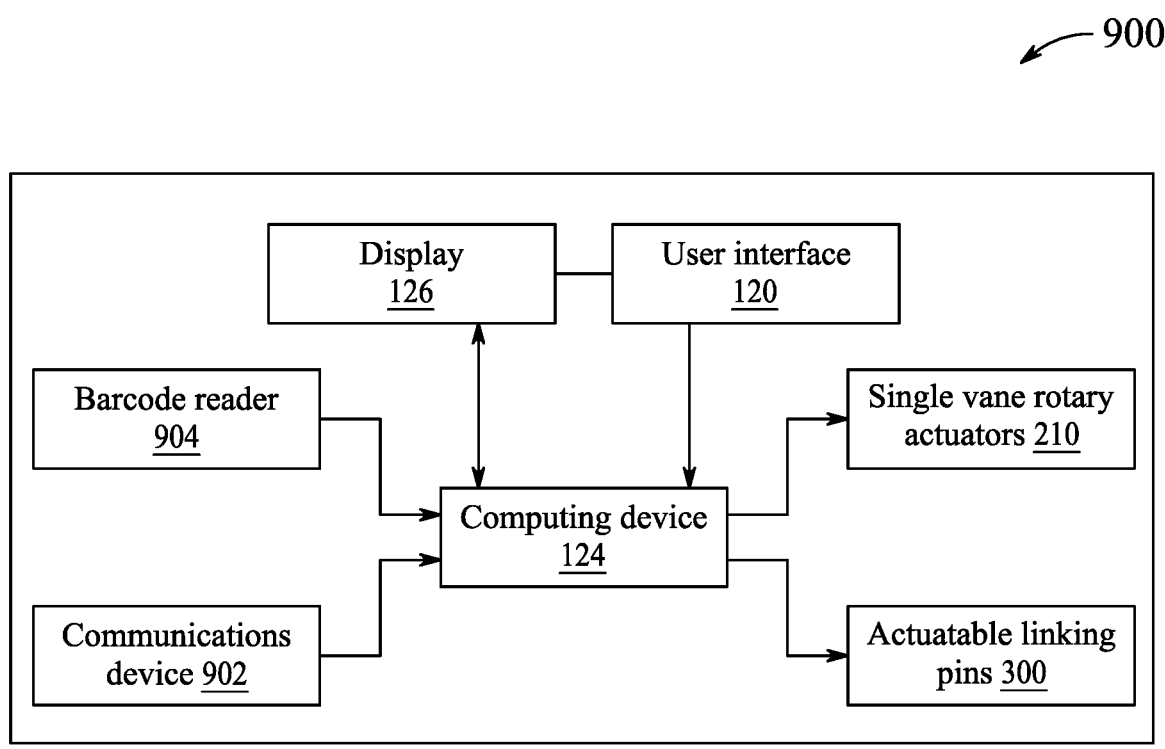
FIG. 9 is a schematic block diagram of an operating control system of the intelligent parcel locker, according to certain embodiments.

Referring to FIG. 9, a schematic block diagram of an operating control system 900 of the intelligent parcel locker 100 is illustrated, according to an aspect of the present disclosure. The operating control system 900 includes the user interface 120 to receive inputs from the user. The user interface 120 is further connected to the computing device 124 of the intelligent parcel locker 100. The operating control system 900 further includes the display 126 connected to the computing device 124. The display 126 displays at least one of the menu and on-screen prompts for the package information. The computing device 124 is connected to the plurality of single vane rotary actuators 210 and to the actuatable linking pins 300 and is configured to receive the request to form a package container and generate a set of command signals to actuate a portion of the single vane rotary actuators 210 to form the package container and actuate a portion of the actuatable linking pins 300 to form a front door of the package container.

The intelligent parcel locker 100 further includes a communications device 902 and a barcode reader 904 connected to the computing device 124. The barcode reader 904 is configured to scan a barcode of a package to be stored in the intelligent parcel locker and transmit the barcode to the computing device 124. The communications device 902 is configured to receive a package dimension, otherwise referred to as the package information. In an aspect of the present disclosure, the communications device 902 is configured to connect with a shipping company and receive the package dimensions from the shipping company based on the barcode. The computing device 124 further includes a non-transitory computer readable medium, having instructions stored therein that, when executed by one or more processors, cause the one or more processors to determine a package container size based on the package dimension and generate the set of command signals. In some aspects of the present disclosure, the computing device 124 includes the non-transitory computer readable medium, having instructions stored therein that, when executed by the one or more processors, cause the one or more processors to determine a pattern of front plates 112 and sets of respective single vane rotary actuators 210 which generate each package container based on a decision tree algorithm 1000.

Figure 10:
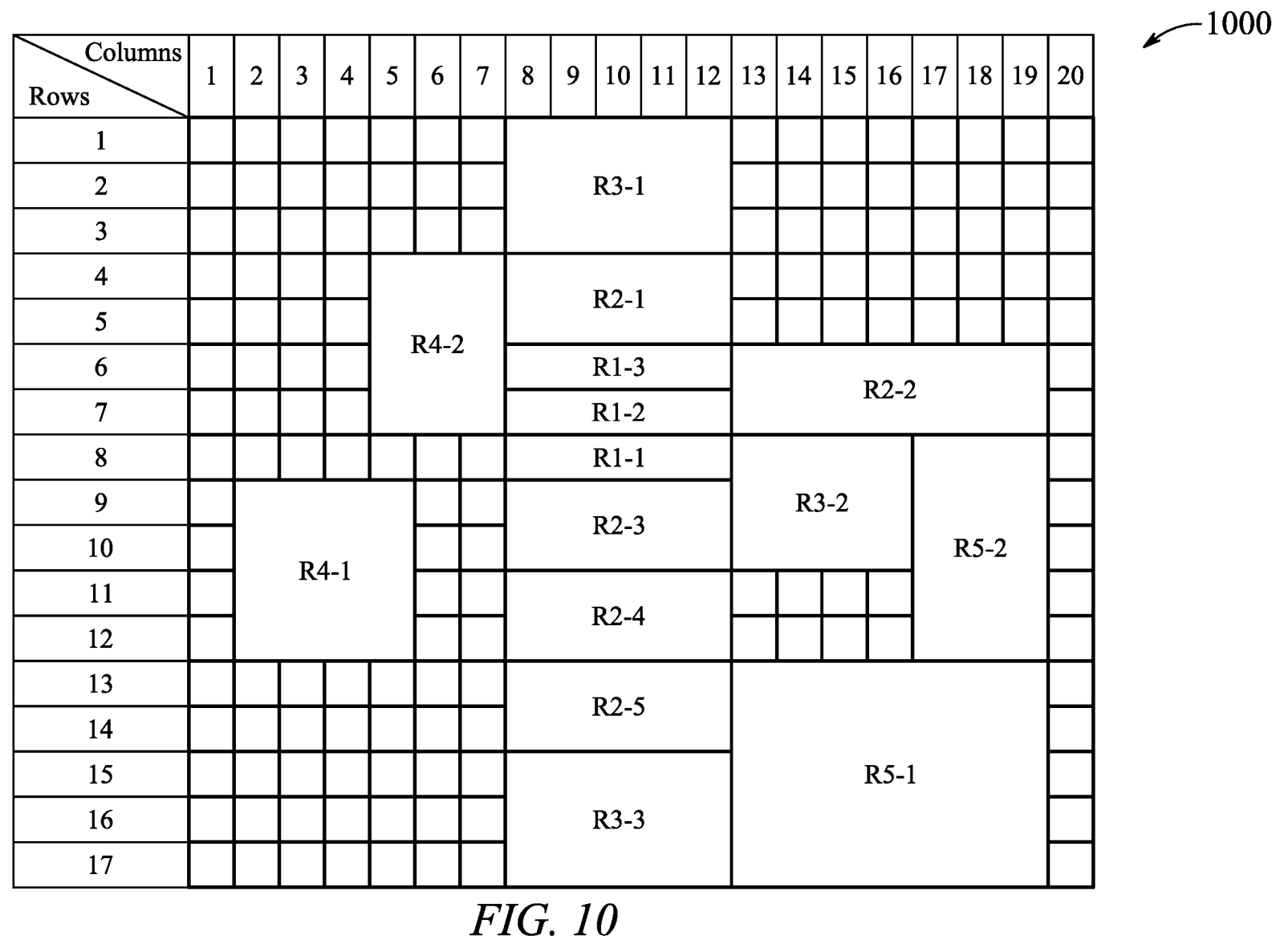

Referring to FIG. 10, a schematic representation of the decision tree algorithm 1000 for selecting package containers is illustrated, according to an aspect of the present disclosure. The intelligent parcel locker 100 having the exemplary height of 170 cm and the exemplary width of 200 cm is considered for the illustration purpose of the decision tree algorithm 1000 of the present disclosure. The 170 cm×200 cm size intelligent parcel locker 100 includes the individual front plates 112 having the size of 10 cm×10 cm, hence the intelligent parcel locker 100 includes three hundred forty front plates 112 in total. The intelligent parcel locker 100 uses the decision tree algorithm 1000 to determine a best location to create a package container for a package based on a dimension thereof. The decision tree algorithm 1000 searches for the best location based on rows of the intelligent parcel locker 100. Each row is marked with Arabic numerals 1 to 17 from top to bottom at left side and each column is marked with Arabic numerals 1 to 20 from left to right at top of the schematic front surface 112A of the intelligent parcel locker 100.

The decision tree algorithm 1000 helps to store each package more efficiently because each row will be allocated for different size packages. The $1^{st}$, $2^{nd}$, and $3^{rd}$ rows will be used for packages requiring three horizontal front plates 112; the $4^{th}$ and $5^{th}$ rows will be used for packages requiring two horizontal front plates 112; the $6^{th}$ and $7^{th}$ rows will be used for packages requiring two horizontal front plates 112; the $8^{th}$ row will be used for packages requiring one horizontal front plate 112; the $9^{th}$, $10^{th}$, $11^{th}$, and $12^{th}$ rows will be used for packages requiring four horizontal front plates 112; and the $13^{th}$, $14^{th}$, $15^{th}$, $16^{th}$, and $17^{th}$ rows will be used for packages requiring five horizontal front plates 112. Further, number of columns required for the package will be selected to define a package container based on the size of the package.

In an example, if a package has a height of 10 cm and width of 100 cm, the operating control system 900 may use the decision tree algorithm 1000 to search for the best row for the package. As the size of the package is 10 cm tall, the package will require only one row. The operating control system 900 will check which row is 10 cm or less and check for the best available location. The first option that the operating control system 900 will consider is the $8^{th}$ row and check available number of columns required for a package container. If the identified location satisfies size requirements of the package, then a package container to store the package will be formed. If the $8^{th}$ row is full, then the operating control system 900 will check the 7$^{th}$ row, and if the 7$^{th}$ row is also not available, then the operating control system 900 will choose the 6$^{th}$ row.

In an example, identification of such row may be defined by an expression,

[R(n)–S], wherein

R(n): Number of rows, and
S: Sequence.

If a package requires two rows, the operating control system 900 will choose the 4$^{th}$ and 5$^{th}$ rows to check for required number of columns. If the identified location satisfies size requirements, a package container will be formed. If there is no available space, the operating control system 900 will choose the 6$^{th}$ and 7$^{th}$ rows to check for required number of columns. If 6$^{th}$ and 7$^{th}$ rows are also full, then the operating control system 900 will choose the 9$^{th}$ and 10$^{th}$ rows. If 9$^{th}$ and 10$^{th}$ rows are also full, the operating control system 900 will choose the 11$^{th}$ and 12$^{th}$ rows. If 11$^{th}$ and 12$^{th}$ rows are also full, then the operating control system 900 will choose the 13$^{th}$ and 14$^{th}$ rows.

If a package requires three rows, then the operating control system 900 will choose the 1$^{st}$, 2$^{nd}$, and 3$^{rd}$ rows for required number of columns for storing the package. If the identified location satisfies size requirements, a package container will be created. If the 1$^{st}$, 2$^{nd}$, and 3$^{rd}$ rows do not have space, then the operating control system 900 will choose the 8$^{th}$, 9$^{th}$, and 10$^{th}$ rows. If the 8$^{th}$, 9$^{th}$, and 10$^{th}$ rows do not satisfy the size requirements, then the operating control system 900 will choose the 15$^{th}$, 16$^{th}$, and 17$^{th}$ rows.

If a package requires four rows, then the operating control system 900 will check the 9$^{th}$, 10$^{th}$, 11$^{th}$, and 12$^{th}$ rows to see if there are enough columns for the measurement of the package. If the location satisfies the size requirements, a package container will be created. If these rows do not satisfy the size requirements, then the operating control system 900 will choose the 4th, 5th, 6th, and 7th rows.

If a package requires five rows, then the operating control system 900 will choose the 13$^{th}$, 14$^{th}$, 15$^{th}$, 6$^{th}$, and 17$^{th}$ rows for required number of columns based on the size of the package. If the identified location satisfies the size requirements, then a package container is created. If the 13$^{th}$, 14$^{th}$, 15$^{th}$, 16$^{th}$, and 17$^{th}$ rows are unable to satisfy the size requirements, then the operating control system 900 will choose the 8$^{th}$, 9$^{th}$, 10$^{th}$, 11$^{th}$, and 12$^{th}$ rows to create a package container to store the package.

Figure 11:
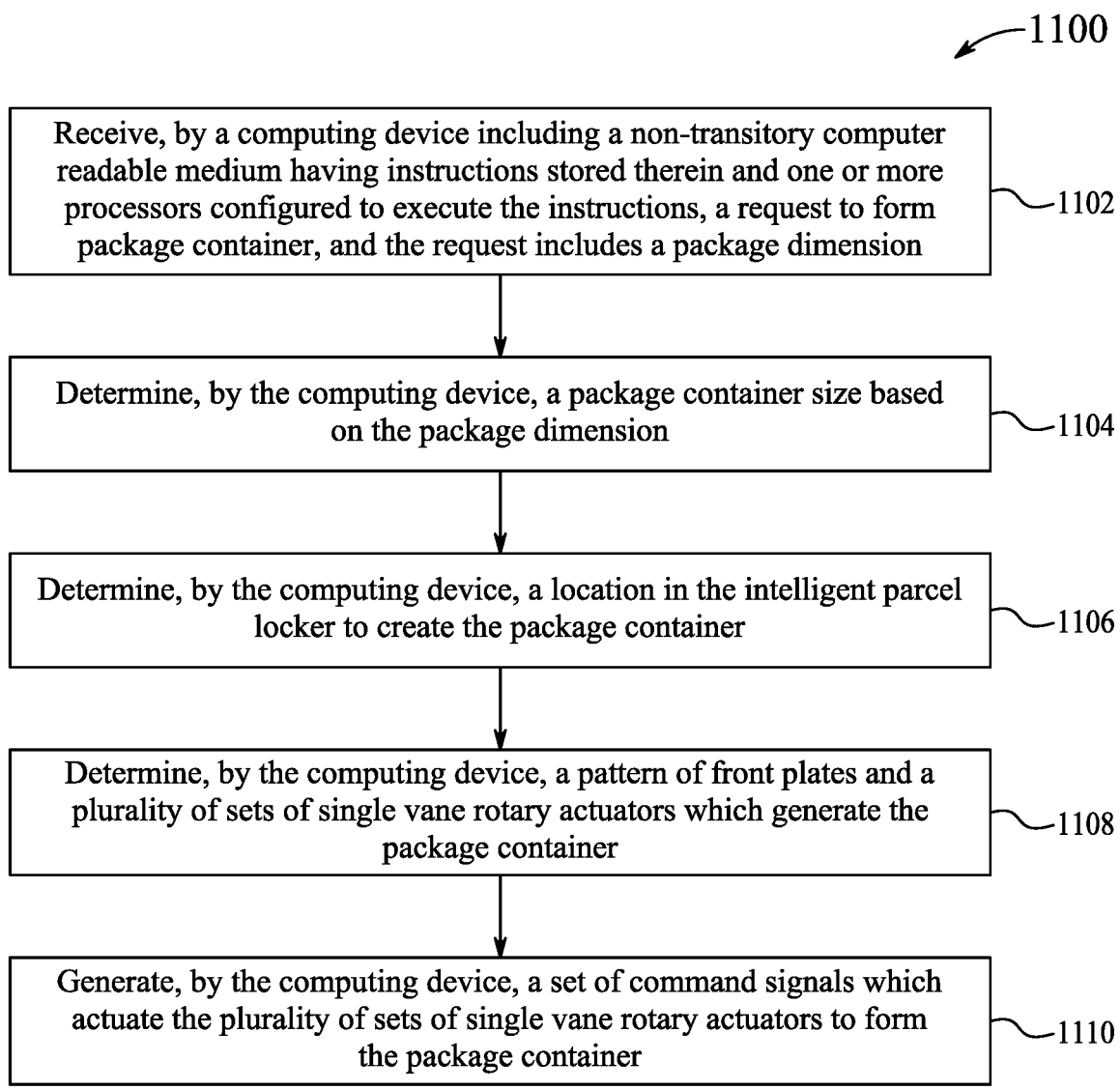
FIG. 11 is a schematic flowchart of a method of forming a package container in the intelligent parcel locker, according to certain embodiments.

Referring to FIG. 11, a schematic flow diagram of a method 1100 of forming a package container in the intelligent parcel locker 100 is illustrated, according to an aspect of the present disclosure. The method 1100 of forming a package container is further illustrated with reference to FIG. 12A, FIG. 12B, and FIG. 12C, which illustrate a perspective view, a top view and a side view, respectively, of the intelligent parcel locker 100 of FIG. 1 showing a package container 1200 having a size of 20 cm height, 30 cm length and 20 cm depth. Particularly, the package container 1200 is defined by two rows and three columns of the front plates 112 and two linked plates each from a set of linked first side plates 202, a set of linked second side plates 204, a set of linked top plates 206, and a set of linked bottom plates 208.

At step 1102, the method 1100 includes receiving the request from the user to form the package container 1200 by the computing device 124. The request includes a package dimension such as a height, a length and a depth of a package to be stored in the package container 1200. In the illustrated example, the size of the package may be equal to or less than 20 cm height, 30 cm length and 20 cm depth. The computing device 124 includes the non-transitory computer readable medium having instructions stored therein and the one or more processors are configured to execute the instructions. In one aspect, the user may input the package dimensions via the keypad 122 such that the computing device 124 connected to the user interface 120 may receive the package dimensions. In another aspect, the user may use the barcode reader 904 to scan a barcode associated with the package, and the barcode may be associated with the package dimension. As such, the computing device 124 that is connected to the barcode reader 904 receives the package dimension. In some aspects, the computing device 124 may receive the package dimension from the shipping company located at a remote location through the communications device 902. In some aspects, the computing device 124 may receive the package dimension through the computer application stored on a user's smartphone, on a remote computer, or through an application on a shipping website.

At step 1104, the method 1100 includes determining a package container size based on the package dimension by the computing device 124. The computing device 124 may include a memory to store dimensional details of each of the front plates 112, the linked first side plates 206, the linked second side plates 204, the linked top plates 206, and the linked bottom plates 208. In the illustrated example, each front plate 112 is a square shape of 10 cm×10 cm size and each linked plate is a square shape of 10 cm×10 cm. As such, for the 30 cm length package container 1200, the computing device 124 determines, based on the decision tree algorithm 1000, a row having three individual front plates 112, and for the 20 cm height, the computing device 124 determines two available rows and three columns. Further, for the 20 cm depth package container 1200, the computing device 124 determines that two individual linked plates from each of the linked first side plates 202, the linked second side plates 204, the linked top plates 206, and the linked bottom plates 208. As such, the computing device 124 is configured to determine the package container size in the intelligent parcel locker 100 based on the package dimension.

At step 1106, the method 1100 includes determining a location in the intelligent parcel locker 100 to create the package container 1200 by the computing device 124. The one or more processors of the computing device 124 is configured to identify the location of the package container 1200 based on the decision tree algorithm 1000. In an aspect, the method 1100 includes determining, by the computing device 124, the location in the intelligent parcel locker 100 which includes the pattern of the front plates 112 and the sets of respective single vane rotary actuators 210 which generate each package container based on the decision tree algorithm 1000. In the illustrated example, two rows and three columns are required to form the package container 1200. As such, the operating control system 900 chooses the 4$^{th}$ and 5$^{th}$ rows to check for three number of columns based on the availability of space. If the identified location satisfies the package container size, then the computing device 124 determines the package container 1200 to be formed in the intelligent parcel locker 100. If there is no available space, the operating control system 900 may choose the 6$^{th}$ and 7$^{th}$ rows to check for required number of columns, and if the 6$^{th}$ and 7$^{th}$ rows are also full, then the operating control system 900 may choose the 9$^{th}$ and 10$^{th}$ rows, and if the 9$^{th}$ and 10$^{th}$ rows are also full, the operating control system 900 will choose the 11$^{th}$ and 12$^{th}$ rows, and if the 11$^{th}$ and 12$^{th}$ rows are also full, then the operating control system 900 will choose the 13$^{th}$ and 14$^{th}$ rows.

Figure 13A:
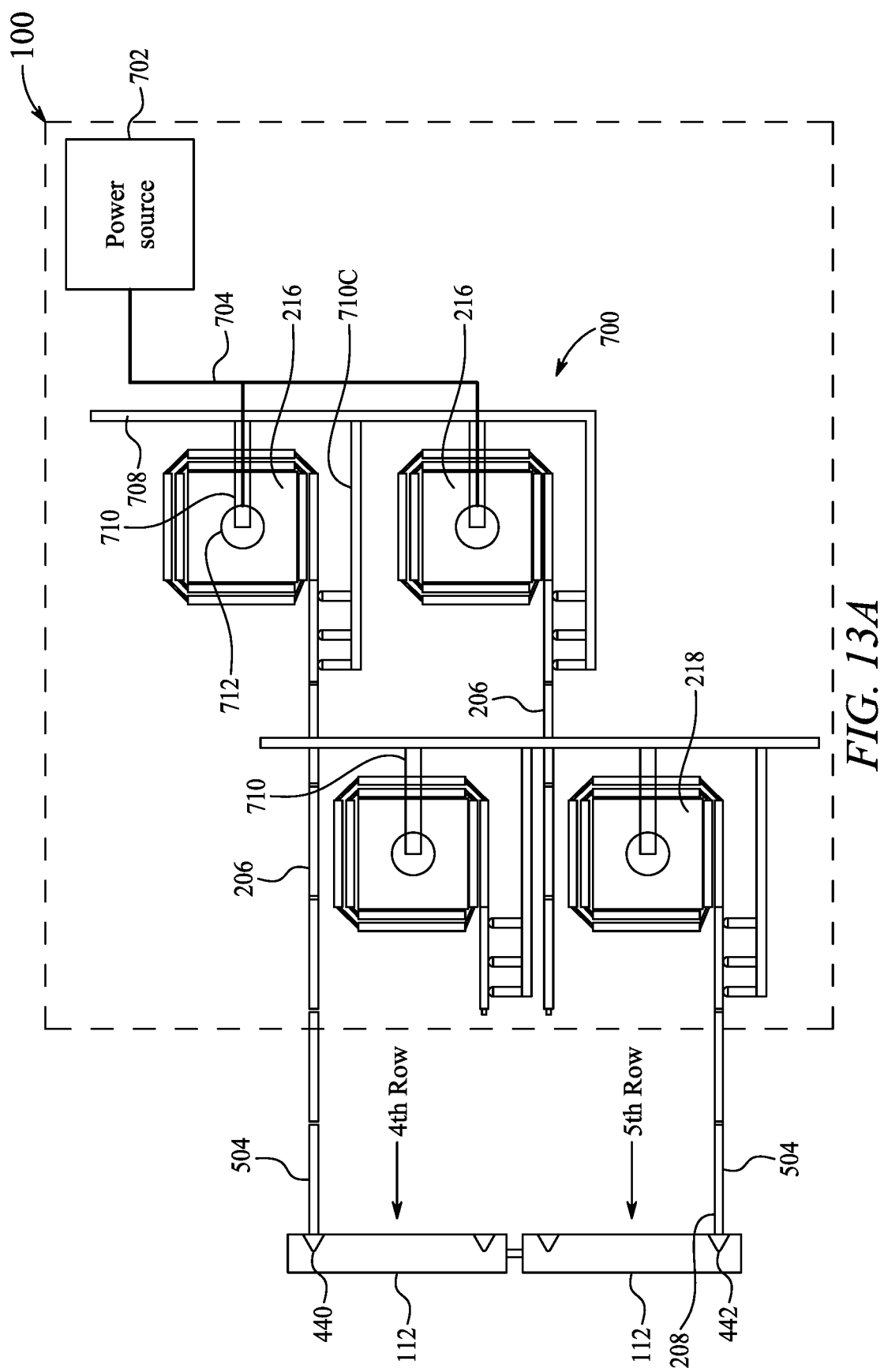
FIG. 13A is a schematic side view of the intelligent parcel locker of FIG. 12A illustrating movements of a set of linked top plates and a set of linked bottom plates, according to certain embodiments.

At step 1108, the method 1100 includes determining the pattern of the front plates 112 and the plurality of sets of single vane rotary actuators 210 which generates the package container 1200 by the computing device 124. Referring to FIG. 13A, actuation of the sets of single vane rotary actuators 210 is illustrated, according to an aspect of the present disclosure. Particularly, a schematic side view of the front plates 112 associated with the $4^{th}$ and $5^{th}$ rows is shown in FIG. 13A as illustrated in FIG. 7A. If the $4^{th}$ and $5^{th}$ rows are identified to form the package container 1200, then the computing device 124 may actuate the third single vane rotary actuator 216 associated with the set of linked top plates 206 of the front plates 112 in the $4^{th}$ row and actuate the fourth single vane rotary actuator 218 associated with the set of linked bottom plates 208 of the front plates 112 in the $5^{th}$ row. Similarly, if $7^{th}$, $8^{th}$ and $9^{th}$ columns are identified to form the package container 1200, then the computing device 124 may actuate the first single vane rotary actuator 212 associated with the set of linked first side plates 202 of the front plates 112 in the $7^{th}$ column and actuate the second single vane rotary actuator 214 associated with the set of linked second side plates 204 of the front plates 112 in the $9^{th}$ column. Further, the front plates 112 associated with the $4^{th}$ and $5^{th}$ rows and $7^{th}$ to $9^{th}$ columns are connected by the actuatable linking pins 300 to form a front door 1202 for the package container 1200 and the surrounding front plates 112 are disconnected from the front plates 112 forming the front door 1202.

At step 1110, the method 1100 includes generating, by the computing device 124, a set of command signals which actuate the plurality of sets of single vane rotary actuators 210 to form the package container 1200. The computing device 124 generates the command signal based on the identified pattern of the front plates 112 and the identified single vane rotary actuators 210. In an aspect, the method 1100 includes transmitting power from the power source 706 and command signals from the computing device 124 through the wiring harness 704 in the support structure 700 of the intelligent parcel locker 100 to each of the single vane rotary actuators 210, and from each of the single vane rotary actuators 210 through the non-actuatable linking pins 530 to the actuatable linking pins 300 and the actuatable linking pin receptacles 410. Particularly, the computing device 124 communicates with the third single vane rotary actuator 216 associated with the set of linked top plates 206 of the front plates 112 in the $4^{th}$ row and the fourth single vane rotary actuator 218 associated with the set of linked bottom plates 208 of the front plates 112 in the $5^{th}$ row. Similarly, the computing device 124 communicates the command signal with the first single vane rotary actuator 212 associated with the set of linked first side plates 202 of the front plates 112 in the $7^{th}$ column and the second single vane rotary actuator 214 associated with the set of linked second side plates 204 of the front plates 112 in the $9^{th}$ column. Further, the computing device 124 communicates the command signal with the actuatable linking pins 300 of the front plates 112 associated with the $4^{th}$ and $5^{th}$ rows and $7^{th}$ to $9^{th}$ columns to form the front door 1202 for the package container 1200.

The computing device 124 may determine the number of side plates to dispense based on the smallest package dimension. For example, for a package of $28 \times 15 \times 35$ cm$^3$, two side plates may be dispensed, and the door may be 3 front plates by 4 front plates wide. It is advantageous to minimize the extension of the package containers from the front of the parcel locker, especially for the top rows, to prevent the parcel locker from becoming top heavy.

Alternatively, the computing device 124 may use the smallest dimensions of the package for the front door of the parcel locker when necessary to fully utilize the parcel locker capacity and when depth or top heaviness of the parcel locker is not a consideration. In the example of the package having dimensions of $28 \times 15 \times 35$ cm$^3$, a package container utilizing 2 plates in a row, 3 plates in a column and 4 plates in a depth direction of the parcel container may be generated. Alternatively, the package container may utilize 3 plates of a row, 2 plates of a column and 4 plates in the depth direction.

The method 1100 of forming the package container 1200, particularly, includes dispensing, by the first single vane rotary actuator 212, the plurality of linked first side plates 202 associated with the front plates 112 of the $7^{th}$ column which are parallel to the first side wall 102 of the intelligent parcel locker 100 and dispensing, by the second single vane rotary actuator 214, the plurality of linked second side plates 204 associated with the front plates 112 of the $9^{th}$ column which are parallel to the second side wall 104 of the intelligent parcel locker 100. The method 1100 further includes dispensing, by the third single vane rotary actuator 216, the plurality of linked top plates 206 associated with the front plates 112 of the $4^{th}$ row which are parallel to the top wall 106 of the intelligent parcel locker 100 and dispensing, by the fourth single vane rotary actuator 218, the plurality of linked bottom plates 208 associated with the front plates 112 of the $5^{th}$ row which are parallel to the bottom wall 108 of the intelligent parcel locker 100.

The method 1100 further includes inserting the set of connecting pins 506 of the outermost plate 504 of each of the plurality of linked first side plates 202 and the plurality of linked second side plates 204 into the respective actuatable linking pin receptacles 436, 438 of the respective front plates 112 and releasing the set of actuatable linking pins 300 along a perimeter of the pattern of linked front plates 112. The method 1100 further includes continuing to dispense the plurality of linked first side plates 202, the plurality of linked second side plates 204, the plurality of linked top plates 206 and the plurality of linked bottom plates 208 until the package container 1200 matches the package container size.

Figure 13B:
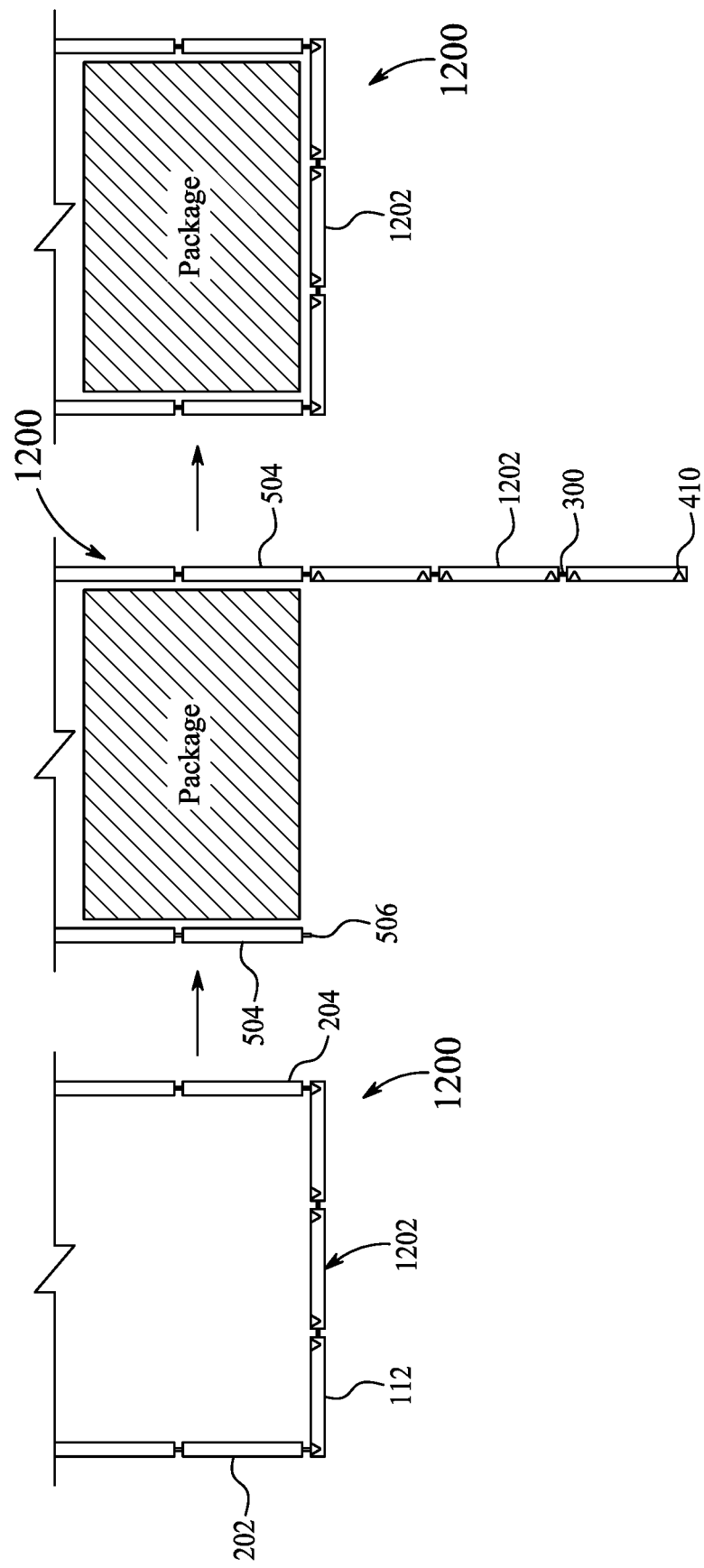
FIG. 13B is a schematic top view of the package container of FIG. 12A showing actuation of a front door, according to certain embodiments.

Referring to FIG. 13B, a schematic top view showing actuation of the front door 1202 is illustrated, according to an aspect of the present disclosure. During the formation of the package container 1200, the computing device 124 actuates the connecting pins 506 of the outermost linked first side plate 504 of the linked first side plates 202 with the third plurality of the actuatable linking pin receptacles 436 of the front plate 112 in the $7^{th}$ column and actuates the connecting pins 506 of the outermost linked second side plate 504 of the linked second side plates 204 with the fourth plurality of the actuatable linking pin receptacles 438 of the front plate 112 in the $9^{th}$ column. While accessing the package container 1200 to store the package, the computing device 124 actuates the connecting pins 506 of the outermost linked first side plate 504 of the linked first side plates 202 to disengage from the third plurality of the actuatable linking pin receptacles 436 of the front plate 112 in the $7^{th}$ column while the connecting pins 506 of the outermost linked second side plate 504 of the linked second side plates 204 intact with the fourth plurality of the actuatable linking pin receptacles 438 of the front plate 112 in the $9^{th}$ column. Such that the front door 1202 may be moved away from the linked first side plates 202 relative to the linked second side plate 204 to store the package. Upon storing the package, the front door 1202 may be moved towards the linked first side plates 202 and the computing device 124 actuates the connecting pins 506 of the outermost linked first side plate 504 of the linked first side plates 202 to engage with the third plurality of the actuatable linking pin receptacles 436 of the front plate 112 in the 7$^{th}$ column.

The intelligent parcel locker 100 of the present disclosure helps to reduce the footprint of the outer dimensions of the parcel locker 100 as mounted at a venue. Further, the intelligent parcel locker 100 of the present disclosure generates an appropriate locker size and position in the parcel locker for each package, based on package dimensions and weight. Further, the intelligent parcel locker 100 of the present disclosure provides better packing of all packages as the space will be used more efficiently compared to traditional parcel lockers with a fixed and inflexible shape. As the intelligent parcel locker 100 is foldable down to a base size when not in use, it does not occupy as much space as a conventional parcel locker. Further, the intelligent parcel locker 100 can be easily installed at locations where space is limited, due to having smaller size and flexibility in package container generation. As the intelligent parcel locker 100 of the present disclosure is flexible and can accommodate a greater number of packages than an equivalently sized conventional parcel locker, which is able to hold only a fixed, inflexible number of packages.

The first embodiment of the present disclosure is illustrated with respect to FIG. 1 through FIG. 10. The first embodiment describes the intelligent parcel locker 100 comprising: the first side wall 102, the second side wall 104, the top wall 106, and the bottom wall 108, wherein each wall is perpendicularly oriented with respect to the back wall 110; the plurality of front plates 112 configured to form the front surface 112A of the intelligent parcel locker 100, wherein the plurality of front plates 112 are connected to each other by the plurality of actuatable linking pins 300; the plurality of sets of single vane rotary actuators 210, including: the first single vane rotary actuator 212 including the plurality of linked first side plates 202, wherein the first single vane rotary actuator 212 is configured to dispense each linked first side plate 202 such that each linked first side plate 202 is parallel to the first side wall 102; the second single vane rotary actuator 214 including the plurality of linked second side plates 204, wherein the second single vane rotary actuator 214 is configured to dispense each linked second side plate 204 such that each linked second side plate 204 is parallel to the second side wall 104; the third single vane rotary actuator 216 including the plurality of linked top plates 206, wherein the third single vane rotary actuator 216 is configured to dispense each linked top plate 206 such that each linked top plate 206 is parallel to the top wall 106; and the fourth single vane rotary actuator 218 including the plurality of linked bottom plates 208, wherein the fourth single vane rotary actuator 218 is configured to dispense each linked bottom plate 208 such that each linked bottom plate 208 is parallel to the bottom wall 108; and the computing device 124 connected to the plurality of sets of single vane rotary actuators 210 and to the plurality of actuatable linking pins 300, wherein the computing device 124 is configured to receive the request to form the package container 1200 and generate the set of command signals to actuate the portion of the sets of single vane rotary actuators 210 to form the package container 1200 and actuate the portion of the plurality of actuatable linking pins 300 to form the front door 1202 of the package container 1200.

In some aspects of the intelligent parcel locker 100, each linked first side plate 202, each linked second side plate 204, each linked top plate 206 and each linked bottom plate 208 includes the first plurality of non-actuatable linking pins 532 which extend outward from the first edge 522 of the linked plate; the second plurality of non-actuatable linking pins 534 which extend outward from the third edge 526 of the linked plate, wherein the third edge 526 is parallel to the first edge 522; the plurality of linking pin which extend outward from the second edge 524 of the linked plate, wherein the second edge 524 is connected to and perpendicular to the first edge 522; and the plurality of linking pin receptacles which extend inward from the fourth edge 528 of the linked plate, wherein the fourth edge 528 is connected to the third edge 526 and is parallel to the second edge 524.

In some aspects of the intelligent parcel locker 100, each single vane rotary actuator 210 is wrapped with the respective plurality of linked plates and is configured to dispense its respective plurality of linked plates by rotating each linked plate from the first orientation to the second orientation perpendicular to the first orientation.

In some aspects, the intelligent parcel locker 100 further comprising: the power source 706; and the support structure 700 located within the intelligent parcel locker 100, wherein the support structure 700 includes the wiring harness 704 connected to the power source 706 and the computing device 124, and wherein the wiring harness 704 is configured to transmit the command signals from the computing device 124 to the plurality of sets of single vane rotary actuators 210.

In some aspects of the intelligent parcel locker, the support structure 700 includes the grid structure of support bars 708 connected to the back wall 110 and the plurality of support arms 710 connected perpendicularly to the grid structure of support bars 708.

In some aspects, the intelligent parcel locker further comprising: the drive shaft 712 connected to each single vane rotary actuator 210, wherein each drive shaft 712 includes the first end and 712A the second end 712B, wherein the first support arm 710A and the second support arm 710B of the plurality of support arms 710 are connected to the first end 712A and the second end 712B of the drive shaft 712 respectively, and wherein the power source 706 is connected to each single vane rotary actuator 210 through the wiring harness 704.

In some aspects, the intelligent parcel locker 100 further comprising; the third support arm 710C located below each single vane rotary actuator 210, wherein each third support arm 710C is connected to the support structure 700; the plurality of struts 716 located on each third support arm 710C below each single vane rotary actuator 210; and the wheel 718 located on the end of each strut 716, wherein the wheel 718 is configured to support and guide linked plates as it exits the respective single vane rotary actuator 210.

In some aspects, the intelligent parcel locker further comprising: the third support arm 710C located below each single vane rotary actuator 210, wherein each third support arm 710C is connected to the support structure 700; the plurality of struts 716 located on each third support arm 710C below each single vane rotary actuator 210; and the roller bearing 720 located on the end of each strut 716, wherein the roller bearing 720 is configured to support and guide linked plates as it exits the respective single vane rotary actuator 210.

In some aspects, the intelligent parcel locker further comprising the electrical connector 610 located within each linked first side plate 202, each linked second side plate 204, each linked top plate 206 and each linked bottom plate 208, wherein the electrical connector 610 extends from each non-actuatable linking pin 530 to the respective actuatable linking pin receptacles 410, wherein the electrical connector 610, each non-actuatable linking pin 530, and each respective actuatable linking pin receptacle 410 are configured to receive the power and the command signals from the wiring harness 704 and transfer the power and the command signals through each linked first side plate 202, each linked second side plate 204, each linked top plate 206 and each linked bottom plate 208 to the actuatable linking pin receptacles 410 of the plurality of front plates 112.

In some aspects of the intelligent parcel locker, each of the plurality of front plates 112 comprises: the first plurality of actuatable linking pins 422 which extend outward from the first edge 412 of the front plate 112; the second plurality of actuatable linking pins 424 which extend outward from the second edge 414 of the front plate 112, wherein the second edge 414 is connected to and perpendicular to the first edge 412; the first plurality of actuatable linking pin receptacles 432 which extend inward from the third edge 416 of the front plate 112, wherein the third edge 416 is connected to the second edge 414 and is parallel to the first edge 412, wherein each of the first plurality of actuatable linking pin receptacles 432 is configured to releasably retain the actuatable linking pin 422 of the adjacent front plate 112; the second plurality of actuatable linking pin receptacles 434 which extend inward from the fourth edge 418 of the front plate 112, wherein the fourth edge 418 is connected to the third edge 416 and is parallel to the second edge 414, wherein each of the second plurality of actuatable linking pin receptacles 434 is configured to releasably retain the actuatable linking pin 424 of one of the adjacent front plate 112 above the respective front plate 112; the third plurality of actuatable linking pin receptacles 436 which extend inward from the back side 404 of the front plate 112, wherein each of the third plurality of actuatable linking pin receptacles 436 is configured to releasably retain the connecting pin 506 of the respective linked first side plate 202; and the fourth plurality of actuatable linking pin receptacles 438 which extend inward from the back side 404 of the front plate 112, wherein each of the fourth plurality of actuatable linking pin receptacles 438 is configured to releasably retain the connecting pin 506 of the respective linked second side plate 204.

In some aspects of the intelligent parcel locker 100, each of the actuatable linking pin receptacles 410 is configured to receive the respective connecting pin 506 of one of the adjacent linked first side plate 202, the adjacent linked second side plate 204, the adjacent linked top plate 206 and the adjacent linked bottom plate 208, receive the set of command signals from the computing device 124, and retain or release the respective connecting pin 506 based on the set of command signals.

In some aspects, the intelligent parcel locker 100 further comprising: the display 126 connected to the computing device 124, wherein the display 126 is configured to display at least one of a menu and on-screen prompts for package information; the user interface 120 located on the intelligent parcel locker 100 and connected to the computing device 124, wherein the user interface 120 is configured to receive at least one of a menu choice and the package dimension; wherein the computing device 124 comprises the non-transitory computer readable medium, having instructions stored therein that, when executed by the one or more processors, cause the one or more processors to determine the package container size and generate the set of command signals.

In some aspects, the intelligent parcel locker further comprising: the communications device 902 connected to the computing device 124, wherein the communications device 902 is configured to receive the package dimension, wherein the computing device 124 includes the non-transitory computer readable medium, having instructions stored therein that, when executed by the one or more processors, cause the one or more processors to determine the package container size based on the package dimension and generate the set of command signals.

In some aspects, the intelligent parcel locker further comprising: the barcode reader 904 connected to the computing device 124, wherein the barcode reader 904 is configured to scan the barcode of the package and transmit the barcode to the computing device 124; the communications device 902 connected to the computing device 124, wherein the communications device 902 is configured to connect with the shipping company and receive package dimensions from the shipping company based on the barcode; wherein the computing device 124 includes the non-transitory computer readable medium, having instructions stored therein that, when executed by the one or more processors, cause the one or more processors to determine the package container size based on the package dimensions and generate the set of command signals.

In some aspects of the intelligent parcel locker, the computing device 124 includes the non-transitory computer readable medium, having instructions stored therein that, when executed by the one or more processors, cause the one or more processors to determine the pattern of front plates 112 and sets of respective single vane rotary actuators 210 which generate each package container based on the decision tree algorithm 1000.

The second embodiment of the present disclosure is illustrated with respect to FIG. 1 through FIG. 13. The second embodiment describes the method 1100 for forming the package container 1200 in the intelligent parcel locker 100. The method 1100 comprising: receiving, by the computing device 124 including the non-transitory computer readable medium having instructions stored therein and the one or more processors configured to execute the instructions, the request to form the package container 1200, the request including the package dimension; determining, by the computing device 124, the package container size based on the package dimension; determining, by the computing device 124, the location in the intelligent parcel locker 100 to create the package container 1200; determining, by the computing device 124, the pattern of front plates 112 and the plurality of sets of single vane rotary actuators 210 which generate the package container 1200; and generating, by the computing device 124, the set of command signals which actuate the plurality of sets of single vane rotary actuators 210 to form the package container 1200.

In some aspects, the method further comprises forming the package container 1200 by: dispensing, by the first single vane rotary actuator 212, the plurality of linked first side plates 202 which are parallel to the first side wall 102 of the intelligent parcel locker 100; dispensing, by the second single vane rotary actuator 214, the plurality of linked second side plates 204 which are parallel to the second side wall 104 of the intelligent parcel locker 100; dispensing, by the third single vane rotary actuator 216, the plurality of linked top plates 206, which are parallel to the top wall 106 of the intelligent parcel locker 100; dispensing, by the fourth single vane rotary actuator 218, the plurality of linked bottom plates 208, which are parallel to the bottom wall 108 of the intelligent parcel locker 100; inserting the plurality of connecting pins 506 of the outermost plate 504 of each of the plurality of linked first side plates 202 and the plurality of linked second side plates 204 into respective actuatable linking pin receptacles 410 of a respective front plate 112; releasing the plurality of actuatable linking pins 300 along the perimeter of the pattern of linked front plates 112; and continuing to dispense the plurality of linked first side plates 202, the plurality of linked second side plates 204, the plurality of linked top plates 206 and the plurality of linked bottom plates 208 until the package container 1200 matches the package container size.

In some aspects, the method further comprises transmitting the power from the power source 706 and command signals from the computing device 124 through the wiring harness 704 in the support structure 700 of the intelligent parcel locker 100 to each of the single vane rotary actuators 210, and from each of the single vane rotary actuators 210 through the non-actuatable linking pins 530 to the connecting pins 506 and the actuatable linking pin receptacles 410.

In some aspects, the method further comprises determining, by the computing device 124, the location in the intelligent parcel locker 100 which includes the pattern of front plates 112 and the sets of respective single vane rotary actuators 210 which generate each package container based on the decision tree algorithm 1000.

The third embodiment of the present disclosure is illustrated with respect to FIG. 1 through FIG. 13. The third embodiment describes the non-transitory computer readable medium, having instructions stored therein that, when executed by the one or more processors, cause the one or more processors to execute the instructions to perform the method 1100 for forming the package container 1200 in the intelligent parcel locker 100. The method 1100 includes receiving, by the computing device 124 including the non-transitory computer readable medium having instructions stored therein and the one or more processors configured to execute the instructions, the request to form the package container 1200. The request includes the package dimension. The method 1100 further includes determining, by the computing device 124, the package container size based on the package dimension; determining, by the computing device 124, the pattern of front plates 112 and the plurality of sets of single vane rotary actuators 210 which generate the package container 1200; determining, by the computing device 124, a location in the intelligent parcel locker 100 which includes the pattern of front plates 112 and the sets of respective single vane rotary actuators 210 which generate each package container based on the decision tree algorithm 1000; generating, by the computing device 124, the set of command signals which actuate the plurality of sets of single vane rotary actuators 210 to form the package container 1200; dispensing, by the first single vane rotary actuator 212, the plurality of linked first side plates 202 which are parallel to the first side wall 102 of the intelligent parcel locker 100; dispensing, by the second single vane rotary actuator 214, the plurality of linked second side plates 204 which are parallel to the second side wall 104 of the intelligent parcel locker 100; dispensing, by the third single vane rotary actuator 216, the plurality of linked top plates 206, which are parallel to the top wall 106 of the intelligent parcel locker 100; dispensing, by the fourth single vane rotary actuator 218, the plurality of linked bottom plates 208, which are parallel to the bottom wall 108 of the intelligent parcel locker 100; inserting the set of linking pins of the outermost plate 504 of each of the plurality of linked first side plates 202 and the plurality of linked second side plates 204 into the respective actuatable linking pin receptacles 410 of the respective front plates 112; releasing the set of actuatable linking pins 300 along the perimeter of the pattern of linked front plates 112; and continuing to dispense the plurality of linked first side plates 202, the plurality of linked second side plates 204, the plurality of linked top plates 206 and the plurality of linked bottom plates 208 until the package container 1200 matches the package container size.

Figure 14:
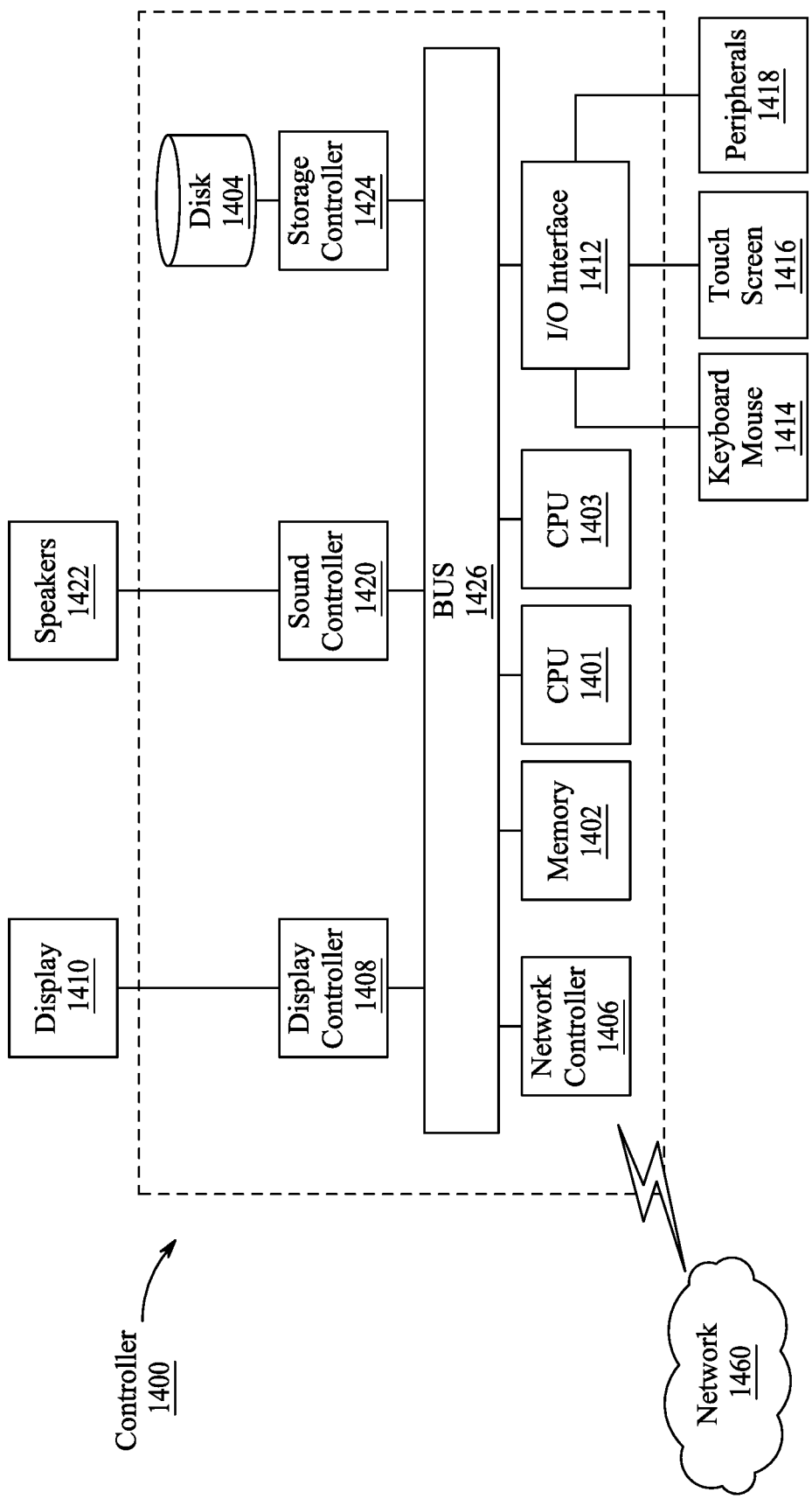
FIG. 14 is an illustration of a non-limiting example of details of computing hardware used in the operating control system of FIG. 9, according to certain embodiments.

Next, further details of the hardware description of the operating control system 900 of FIG. 9 according to exemplary embodiments is described with reference to FIG. 14. In FIG. 14, a controller 1400 is described which is representative of the computing device 124 of FIG. 8 in which the controller 1400 includes a CPU 1401 which performs the processes described above/below. The process data and instructions may be stored in memory 1402. These processes and instructions may also be stored on a storage medium disk 1404 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1401, 1403 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 1401 or CPU 1403 may be a Xenon or Core processor from Intel of America or an Opteron processor from AMD of America, or may be other processor types that would be recognized by one of ordinary skill in the art. Alternatively, the CPU 1401, 1403 may be implemented on an FPGA, ASIC, PLD or using discrete logic circuits, as one of ordinary skill in the art would recognize. Further, CPU 1401, 1403 may be implemented as multiple processors cooperatively working in parallel to perform the instructions of the inventive processes described above.

The computing device in FIG. 14 also includes a network controller 1406, such as an Intel Ethernet PRO network interface card from Intel Corporation of America, for interfacing with network 1460. As can be appreciated, the network 1460 can be a public network, such as the Internet, or a private network such as an LAN or WAN network, or any combination thereof and can also include PSTN or ISDN sub-networks. The network 1460 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1408, such as a NVIDIA GeForce GTX or Quadro graphics adaptor from NVIDIA Corporation of America for interfacing with display 1410, such as a Hewlett Packard HPL2445w LCD monitor. A general purpose I/O interface 1412 interfaces with a keyboard and/or mouse 1414 as well as a touch screen panel 1416 on or separate from display 1410. General purpose I/O interface also connects to a variety of peripherals 1418 including printers and scanners, such as an OfficeJet or DeskJet from Hewlett Packard.

A sound controller 1420 is also provided in the computing device such as Sound Blaster X-Fi Titanium from Creative, to interface with speakers/microphone 1422 thereby providing sounds and/or music.

The general purpose storage controller 1424 connects the storage medium disk 1404 with communication bus 1426, which may be an ISA, EISA, VESA, PCI, or similar, for interconnecting all of the components of the computing device. A description of the general features and functionality of the display 1410, keyboard and/or mouse 1414, as well as the display controller 1408, storage controller 1424, network controller 1406, sound controller 1420, and general purpose I/O interface 1412 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 15.

Figure 15:
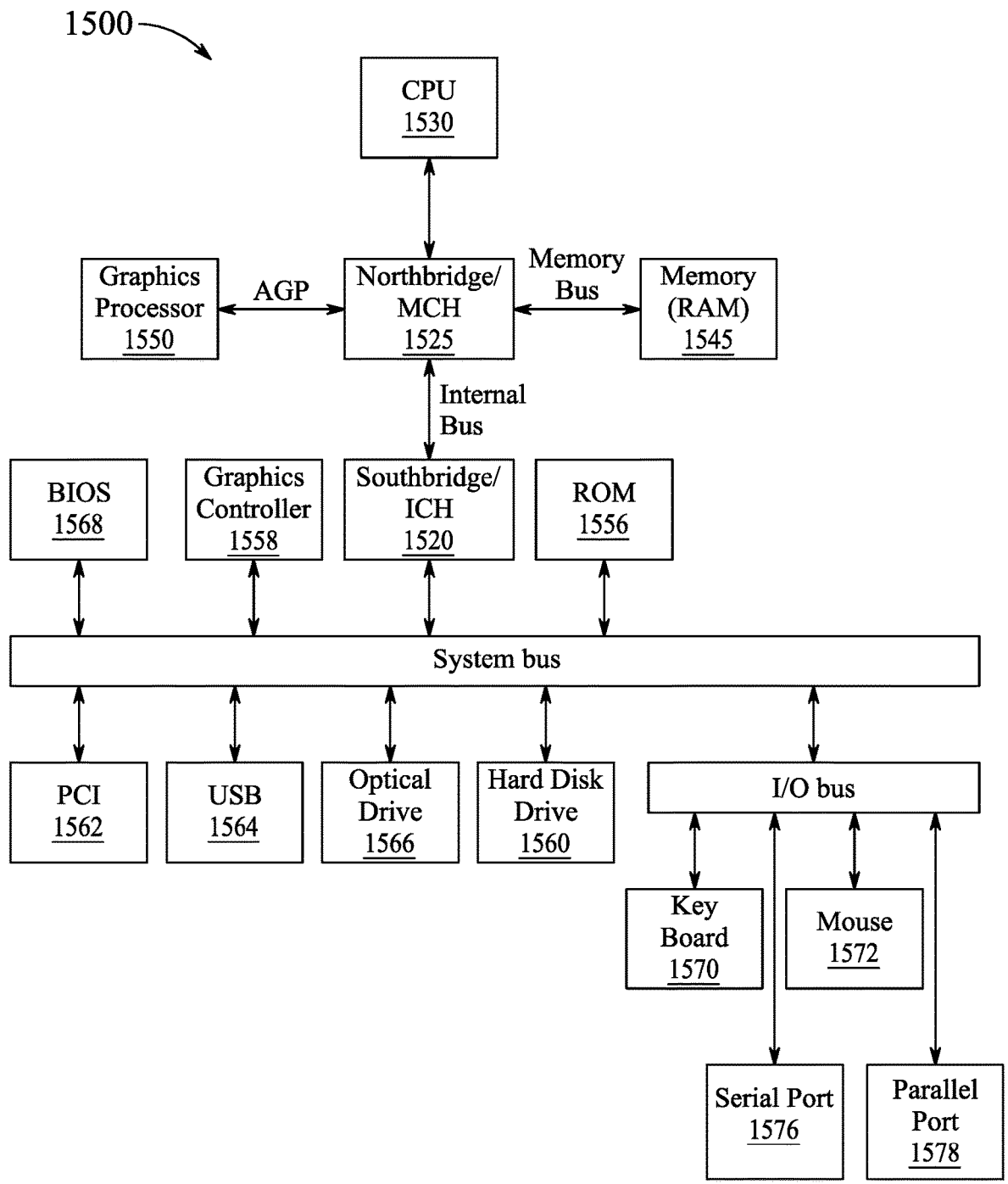
FIG. 15 is an exemplary schematic diagram of a data processing system used within the operating control system, according to certain embodiments.

FIG. 15 shows a schematic diagram of a data processing system, according to certain embodiments, for performing the functions of the exemplary embodiments. The data processing system is an example of a computer in which code or instructions implementing the processes of the illustrative embodiments may be located.

In FIG. 15, data processing system 1500 employs a hub architecture including a north bridge and memory controller hub (NB/MCH) 825 and a south bridge and input/output (I/O) controller hub (SB/ICH) 1520. The central processing unit (CPU) 1530 is connected to NB/MCH 1525. The NB/MCH 1525 also connects to the memory 1545 via a memory bus, and connects to the graphics processor 1550 via an accelerated graphics port (AGP). The NB/MCH 1525 also connects to the SB/ICH 1520 via an internal bus (e.g., a unified media interface or a direct media interface). The CPU Processing unit 1530 may contain one or more processors and even may be implemented using one or more heterogeneous processor systems.

Figure 16:
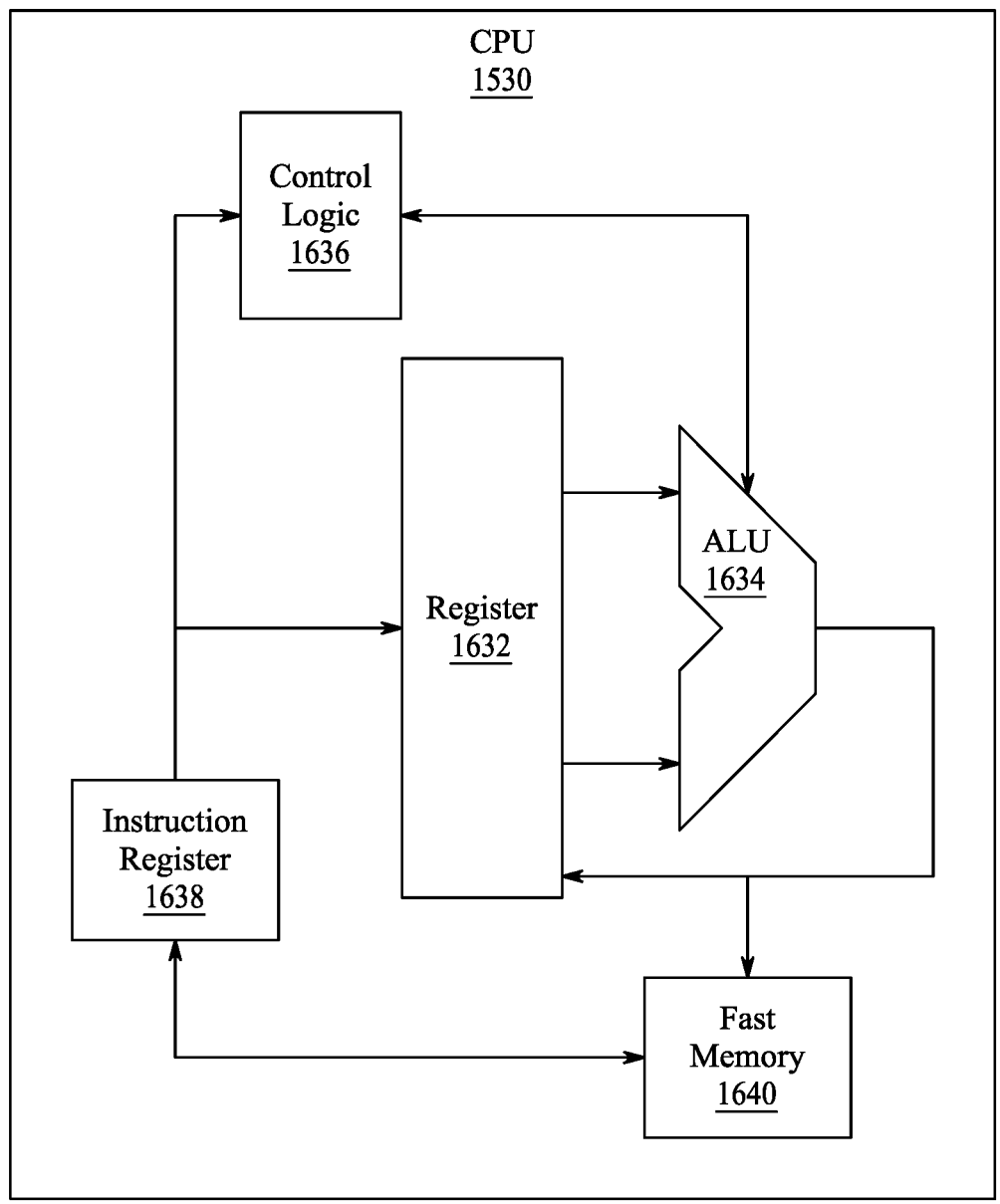
FIG. 16 is an exemplary schematic diagram of a processor used with the operating control system, according to certain embodiments.

For example, FIG. 16 shows one implementation of CPU 1530. In one implementation, the instruction register 1638 retrieves instructions from the fast memory 1640. At least part of these instructions are fetched from the instruction register 1638 by the control logic 1636 and interpreted according to the instruction set architecture of the CPU 1530. Part of the instructions can also be directed to the register 1632. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1634 that loads values from the register 1632 and performs logical and mathematical operations on the loaded values according to the instructions. The results from these operations can be feedback into the register and/or stored in the fast memory 1640. According to certain implementations, the instruction set architecture of the CPU 1530 can use a reduced instruction set architecture, a complex instruction set architecture, a vector processor architecture, a very large instruction word architecture. Furthermore, the CPU 1530 can be based on the Von Neuman model or the Harvard model. The CPU 1530 can be a digital signal processor, an FPGA, an ASIC, a PLA, a PLD, or a CPLD. Further, the CPU 1530 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 15, the data processing system 1500 can include that the SB/ICH 1520 is coupled through a system bus to an I/O Bus, a read only memory (ROM) 1556, universal serial bus (USB) port 1564, a flash binary input/output system (BIOS) 1568, and a graphics controller 1558. PCI/PCIe devices can also be coupled to SB/ICH 888 through a PCI bus 1562.

The PCI devices may include, for example, Ethernet adapters, add-in cards, and PC cards for notebook computers. The Hard disk drive 1560 and CD-ROM 1566 can use, for example, an integrated drive electronics (IDE) or serial advanced technology attachment (SATA) interface. In one implementation the I/O bus can include a super I/O (SIO) device.

Further, the hard disk drive (HDD) 1560 and optical drive 1566 can also be coupled to the SB/ICH 1520 through a system bus. In one implementation, a keyboard 1570, a mouse 1572, a parallel port 1578, and a serial port 1576 can be connected to the system bus through the I/O bus. Other peripherals and devices that can be connected to the SB/ICH 1520 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 17:
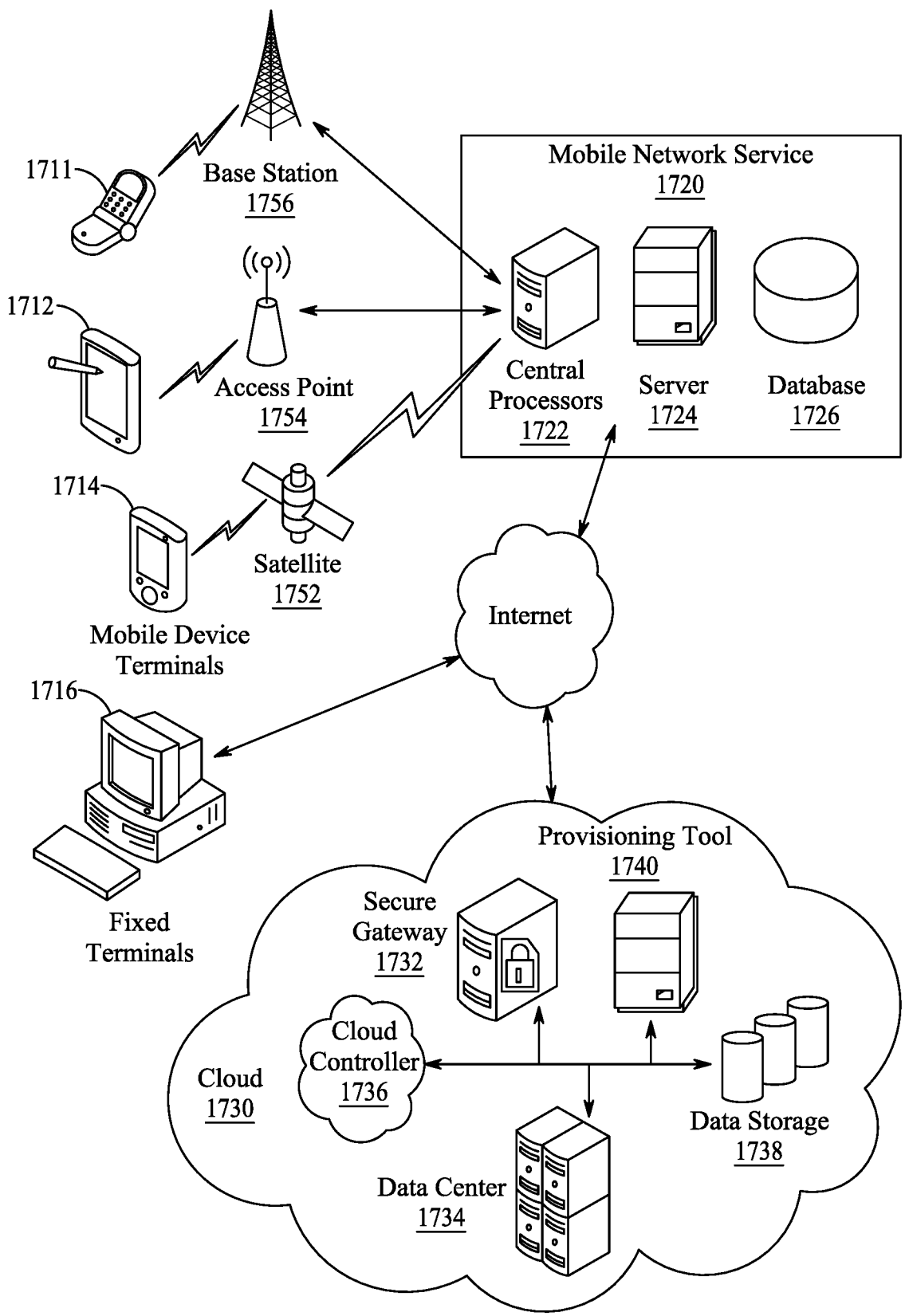
FIG. 17 is an illustration of a non-limiting example of distributed components which may share processing with computing device of the operating control system, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 17, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. An intelligent parcel locker, comprising:
   a first side wall, a second side wall, a top wall, and a bottom wall, wherein each wall is perpendicularly oriented with respect to a back wall;
   a plurality of front plates configured to form a front surface of the intelligent parcel locker, wherein the plurality of front plates are connected to each other by a plurality of actuatable linking pins;
a plurality of sets of single vane rotary actuators, including:
  a first single vane rotary actuator including a plurality of linked first side plates, wherein the first single vane rotary actuator is configured to dispense each linked first side plate such that each linked first side plate is parallel to the first side wall;
  a second single vane rotary actuator including a plurality of linked second side plates, wherein the second single vane rotary actuator is configured to dispense each linked second side plate such that each linked second side plate is parallel to the second side wall;
  a third single vane rotary actuator including a plurality of linked top plates, wherein the third single vane rotary actuator is configured to dispense each linked top plate such that each linked top plate is parallel to the top wall; and
  a fourth single vane rotary actuator including a plurality of linked bottom plates, wherein the fourth single vane rotary actuator is configured to dispense each linked bottom plate such that each linked bottom plate is parallel to the bottom wall; and
a computing device connected to the plurality of sets of single vane rotary actuators and to the plurality actuatable linking pins, wherein the computing device is configured to receive a request to form a package container and generate a set of command signals to actuate a portion of the sets of single vane rotary actuators to form the package container and actuate a portion of the plurality of actuatable linking pins to form a front door of the package container.

2. The intelligent parcel locker of claim 1, wherein each linked first side plate, each linked second side plate, each linked top plate and each linked bottom plate includes:
  a first plurality of non-actuatable linking pins which extend outward from a first edge of the linked plate;
  a second plurality of non-actuatable linking pins which extend outward from a third edge of the linked plate, wherein the third edge is parallel to the first edge;
  a plurality of linking pins which extend outward from a second edge of the linked plate, wherein the second edge is connected to and perpendicular to the first edge; and
  a plurality of linking pin receptacles which extend inward from a fourth edge of the linked plate, wherein the fourth edge is connected to the third edge and is parallel to the second edge.

3. The intelligent parcel locker of claim 1, wherein each single vane rotary actuator is wrapped with a respective plurality of linked plates and is configured to dispense its respective plurality of linked plates by rotating each linked plate from a first orientation to a second orientation perpendicular to the first orientation.

4. The intelligent parcel locker of claim 1, further comprising:
  a power source; and
  a support structure located within the intelligent parcel locker, wherein the support structure includes a wiring harness connected to the power source and the computing device, and wherein the wiring harness is configured to transmit the command signals from the computing device to the plurality of sets of single vane rotary actuators.

5. The intelligent parcel locker of claim 4, wherein the support structure includes a grid structure of support bars connected to the back wall and a plurality of support arms connected perpendicularly to the grid structure of support bars.

6. The intelligent parcel locker of claim 5, further comprising:
  a drive shaft connected to each single vane rotary actuator, wherein each drive shaft includes a first end and a second end,
    wherein a first support arm and a second support arm of the plurality of support arms are connected to the first end and the second end of the drive shaft respectively, and
    wherein the power source is connected to each single vane rotary actuator through the wiring harness.

7. The intelligent parcel locker of claim 6, further comprising:
  a third support arm located below each single vane rotary actuator, wherein each third support arm is connected to the support structure;
  a plurality of struts located on each third support arm below each single vane rotary actuator; and
  a wheel located on an end of each strut, wherein the wheel is configured to support and guide linked plates exiting a respective single vane rotary actuator.

8. The intelligent parcel locker of claim 6, further comprising:
  a third support arm located below each single vane rotary actuator, wherein each third support arm is connected to the support structure;
  a plurality of struts located on each third support arm below each single vane rotary actuator; and
  a roller bearing located on an end of each strut, wherein the roller bearing is configured to support and guide linked plates exiting a respective single vane rotary actuator.

9. The intelligent parcel locker of claim 6, further comprising:
  an electrical connector located within each linked first side plate, each linked second side plate, each linked top plate and each linked bottom plate, wherein the electrical connector extends from each non-actuatable linking pin to a respective actuatable linking pin receptacle, wherein the electrical connector, each non-actuatable linking pin, and each respective actuatable linking pin receptacle are configured to receive the power and the command signals from the wiring harness and transfer the power and the command signals through each linked first side plate, each linked second side plate, each linked top plate and each linked bottom plate to the actuatable linking pin receptacles of the plurality of front plates.

10. The intelligent parcel locker of claim 9, wherein each of the plurality of front plates comprises:
  a first plurality of said actuatable linking pins which extend outward from a first edge of the front plate;
  a second plurality of said actuatable linking pins which extend outward from a second edge of the front plate, wherein the second edge is connected to and perpendicular to the first edge;
  a first plurality of actuatable linking pin receptacles which extend inward from a third edge of the front plate, wherein the third edge is connected to the second edge and is parallel to the first edge, wherein each of the first plurality of actuatable linking pin receptacles is configured to releasably retain an actuatable linking pin of an adjacent front plate;

a second plurality of actuatable linking pin receptacles which extend inward from a fourth edge of the front plate, wherein the fourth edge is connected to the third edge and is parallel to the second edge, wherein each of the second plurality of actuatable linking pin receptacles is configured to releasably retain an actuatable linking pin of one of an adjacent front plate above the respective front plate;

a third plurality of actuatable linking pin receptacles which extend inward from a back side of the front plate, wherein each of the third plurality of actuatable linking pin receptacles are configured to releasably retain a linking pin of a respective first side plate; and a fourth plurality of actuatable linking pin receptacles which extend inward from a back side of the front plate, wherein each of the fourth plurality of actuatable linking pin receptacles is configured to releasably retain a linking pin of a respective second side plate.

11. The intelligent parcel locker of claim 10, wherein each of the actuatable linking pin receptacles is configured to receive a respective linking pin of one of an adjacent first side plate, an adjacent second side plate, an adjacent top plate and an adjacent bottom plate, receive the set of command signals from the computing device, and retain or release the respective linking pin based on the set of command signals.

12. The intelligent parcel locker of claim 1, further comprising:

a display connected to the computing device, wherein the display is configured to display at least one of a menu and on-screen prompts for package information;

a user interface located on the intelligent parcel locker and connected to the computing device, wherein the user interface is configured to receive at least one of a menu choice and a package dimension;

wherein the computing device comprises a non-transitory computer readable medium, having instructions stored therein that, when executed by one or more processors, cause the one or more processors to determine a package container size and generate the set of command signals.

13. The intelligent parcel locker of claim 1, further comprising:

a communications device connected to the computing device, wherein the communications device is configured to receive a package dimension, wherein the computing device includes a non-transitory computer readable medium, having instructions stored therein that, when executed by one or more processors, cause the one or more processors to determine a package container size based on the package dimension and generate the set of command signals.

14. The intelligent parcel locker of claim 1, further comprising:

a barcode reader connected to the computing device, wherein the barcode reader is configured to scan a barcode of a package and transmit the barcode to the computing device;

a communications device connected to the computing device, wherein the communications device is configured to connect with a shipping company and receive package dimensions from the shipping company based on the barcode;

wherein the computing device includes a non-transitory computer readable medium, having instructions stored therein that, when executed by one or more processors, cause the one or more processors to determine a package container size based on the package dimensions and generate the set of command signals.

15. The intelligent parcel locker of claim 1, wherein the computing device includes a non-transitory computer readable medium, having instructions stored therein that, when executed by one or more processors, cause the one or more processors to determine a pattern of front plates and sets of respective single vane rotary actuators which generate each package container based on a decision tree algorithm.

* * * * *